US012428914B2

(12) United States Patent
Eyre et al.

(10) Patent No.: US 12,428,914 B2
(45) Date of Patent: Sep. 30, 2025

(54) NON PLANAR CUTTING ELEMENT WITH NON PLANAR INTERFACE DESIGN AND TOOLS INCORPORATING SUCH ELEMENTS

(71) Applicant: Schlumberger Technology Corporation, Sugar Land, TX (US)

(72) Inventors: Ronald K. Eyre, Provo, UT (US); Feng Yu, Provo, UT (US); Cheng Peng, Provo, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 415 days.

(21) Appl. No.: 17/290,785

(22) PCT Filed: Nov. 8, 2019

(86) PCT No.: PCT/US2019/060425
§ 371 (c)(1),
(2) Date: May 3, 2021

(87) PCT Pub. No.: WO2020/102016
PCT Pub. Date: May 22, 2020

(65) Prior Publication Data
US 2021/0372203 A1    Dec. 2, 2021

Related U.S. Application Data

(60) Provisional application No. 62/758,771, filed on Nov. 12, 2018.

(51) Int. Cl.
*E21B 10/567*    (2006.01)
*B23B 27/14*    (2006.01)
*E21B 10/42*    (2006.01)

(52) U.S. Cl.
CPC ............ *E21B 10/567* (2013.01); *B23B 27/14* (2013.01); *E21B 10/42* (2013.01);
(Continued)

(58) Field of Classification Search
CPC .............. B23B 27/14; B23B 2251/082; B23B 2251/125; B23B 2251/28; E21B 10/42;
(Continued)

(56) References Cited

U.S. PATENT DOCUMENTS 5,709,279 A * 1/1998 Dennis ................ E21B 10/5735
175/430
5,971,087 A  10/1999 Chaves
(Continued)

FOREIGN PATENT DOCUMENTS

CN    104812988 A    7/2015
CN    106460465 A    2/2017
(Continued)

OTHER PUBLICATIONS

International Search Report and Written Opinion issued in International Patent application PCT/US2019/060425 on Apr. 9, 2020.

*Primary Examiner* — Yanick A Akaragwe
(74) *Attorney, Agent, or Firm* — Jeffrey D. Frantz

(57) ABSTRACT

A cutting element may include a substrate having a non-planar upper surface with a peripheral edge, and an ultrahard layer. The upper surface may include at least one depression formed at least proximate the peripheral edge; and a compressive stress hoop extending around the upper surface adjacent the peripheral edge, extending into the at least one depression, and configured to reduce tensile stress in the ultrahard layer. The ultrahard layer may be on the substrate and may have a non-planar top surface and an interface formed between the ultrahard layer and the substrate.

22 Claims, 33 Drawing Sheets

(52) U.S. Cl.
CPC ... *B23B 2251/082* (2013.01); *B23B 2251/125* (2013.01); *B23B 2251/28* (2013.01)

(58) Field of Classification Search
CPC ........ E21B 10/43; E21B 10/55; E21B 10/567; E21B 10/5673; E21B 10/5735
See application file for complete search history.

(56) References Cited

U.S. PATENT DOCUMENTS

| | | |
|---|---|---|
| 6,244,365 B1 | 6/2001 | Southland |
| 6,510,910 B2 | 1/2003 | Eyre |
| 6,550,556 B2 | 4/2003 | Middlemiss |
| 6,604,588 B2 | 8/2003 | Eyre |
| 8,627,905 B2 | 1/2014 | Eyre et al. |
| 2002/0071729 A1 | 6/2002 | Middlemiss |
| 2006/0065447 A1* | 3/2006 | Svendsen ............ E21B 10/5735 175/374 |
| 2007/0181348 A1* | 8/2007 | Lancaster ............. E21B 10/567 175/434 |
| 2011/0036642 A1* | 2/2011 | Eyre ................... E21B 10/5673 175/432 |
| 2015/0259988 A1* | 9/2015 | Chen ................... E21B 10/5673 175/430 |
| 2018/0274303 A1 | 9/2018 | Song |

FOREIGN PATENT DOCUMENTS

| | | |
|---|---|---|
| CN | 108291427 A | 7/2018 |
| CN | 108368727 A | 8/2018 |
| CN | 108474239 A | 8/2018 |
| WO | 2004007901 A1 | 1/2004 |

* cited by examiner

NON PLANAR CUTTING ELEMENT WITH NON PLANAR INTERFACE DESIGN AND TOOLS INCORPORATING SUCH ELEMENTS

CROSS REFERENCE PARAGRAPH

This application is a National Stage Entry of International Application No. PCT/US2019/060425, filed Nov. 8, 2019, which claims the benefit of U.S. Provisional Application No. 62/758,771, entitled "NON PLANAR CUTTING ELEMENT WITH NON PLANAR INTERFACE DESIGN AND TOOLS INCORPORATING SUCH ELEMENTS," filed Nov. 12, 2018, the disclosure of which is hereby incorporated herein by reference.

BACKGROUND

There are several types of downhole cutting tools, such as drill bits, including roller cone bits, hammer bits, and drag bits, reamers and milling tools. Roller cone rock bits include a bit body adapted to be coupled to a rotatable drill string and include at least one "cone" that is rotatably mounted to a cantilevered shaft or journal. Each roller cone supports a plurality of cutting elements that cut and/or crush the wall or floor of the borehole and thus advance the bit. The cutting elements, either inserts or milled teeth, contact with the formation during drilling. Hammer bits generally include a one piece body having a crown. The crown includes inserts pressed therein for being cyclically "hammered" and rotated against the earth formation being drilled.

Drag bits, often referred to as fixed cutter drill bits, include bits that have cutting elements attached to the bit body, which may be a steel bit body or a matrix bit body formed from a matrix material such as tungsten carbide surrounded by a binder material. Drag bits may generally be defined as bits that have no moving parts. Drag bits having abrasive material, such as diamond, impregnated into the surface of the material which forms the bit body are commonly referred to as "impreg" bits. Drag bits having cutting elements made of an ultrahard cutting surface layer or "table" (generally made of polycrystalline diamond material or polycrystalline boron nitride material) deposited onto or otherwise bonded to a substrate are known in the art as polycrystalline diamond compact ("PDC") bits.

SUMMARY

In one aspect, embodiments of the present disclosure are directed to a cutting element which may include a substrate having a non-planar upper surface with a peripheral edge and an ultrahard layer. The upper surface may include at least one depression formed at least proximate the peripheral edge; and a compressive stress hoop extending around the upper surface adjacent the peripheral edge, extending into the at least one depression, and configured to reduce tensile stress in the ultrahard layer. The ultrahard layer may be on the substrate and may have a non-planar top surface and an interface formed between the ultrahard layer and the substrate.

In another aspect, embodiments disclosed herein relate to a cutting element including a substrate and an ultrahard layer. The substrate may have a non-planar upper surface having a peripheral edge, the non-planar upper surface including at least one depression that extends to the peripheral edge. The ultrahard layer may be on the substrate and may include a non-planar top surface having a cutting edge, the cutting edge being over the at least one depression, and a bottom surface, such that the bottom surface of the ultrahard layer and the upper surface of the substrate form an interface. The at least one depression may have a depth and the ultrahard layer has a thickness at the cutting edge such that the peripheral edge of the non-planar upper surface of the substrate is at a minimum height at the at least one depression.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
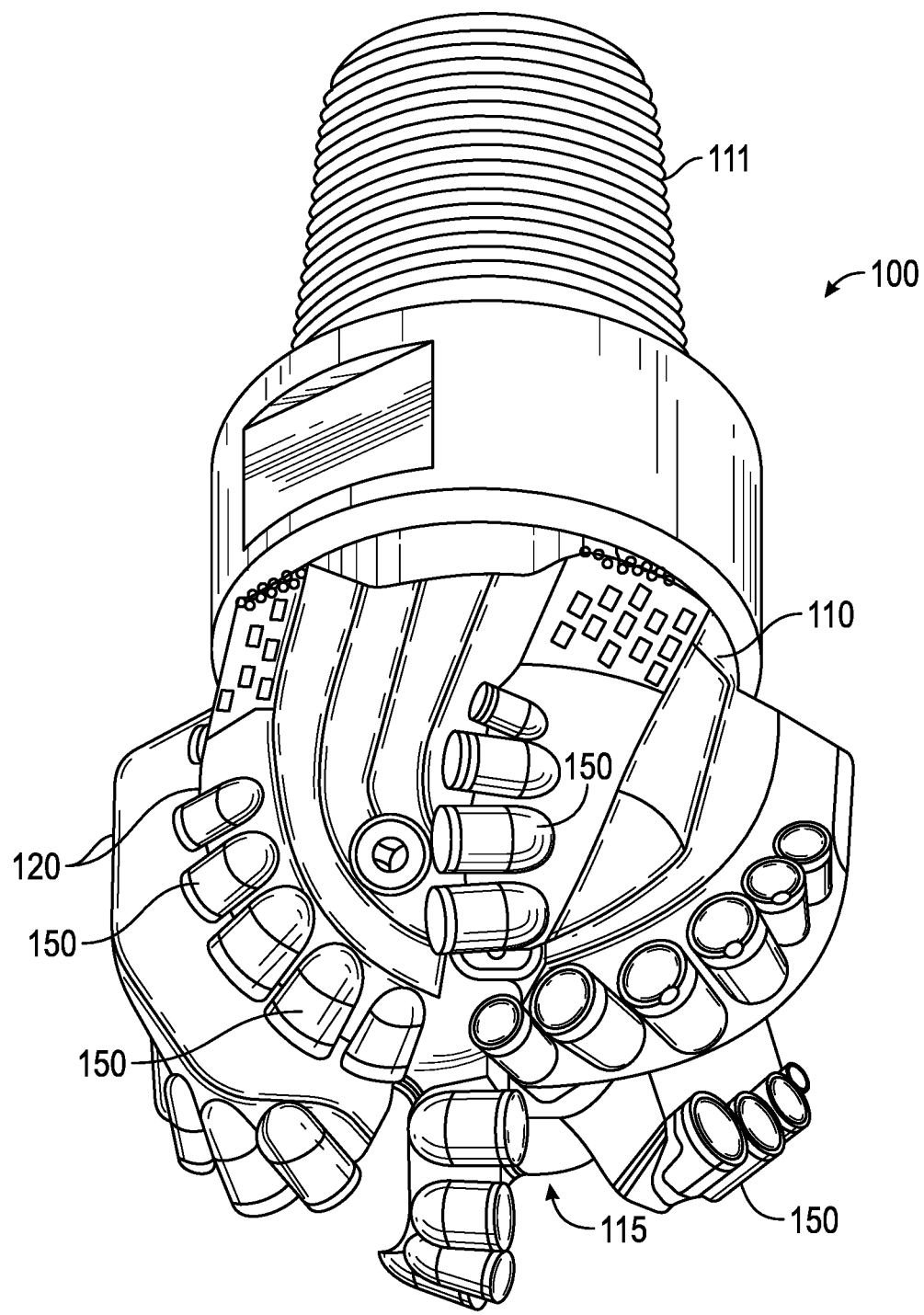
FIG. 1 shows a conventional drag bit.

An example of a drag bit having a plurality of cutting elements with ultra hard working surfaces is shown in FIG.

1. The drill bit 100 includes a bit body 110 having a threaded upper pin end 111 and a cutting end 115. The cutting end 115 generally includes a plurality of ribs or blades 120 arranged about the rotational axis (also referred to as the longitudinal or central axis) of the drill bit and extending radially outward from the bit body 110. Cutting elements, or cutters, 150 are embedded in the blades 120 at predetermined angular orientations and radial locations relative to a working surface and with a desired back rake angle and side rake angle against a formation to be drilled.

Figure 2:
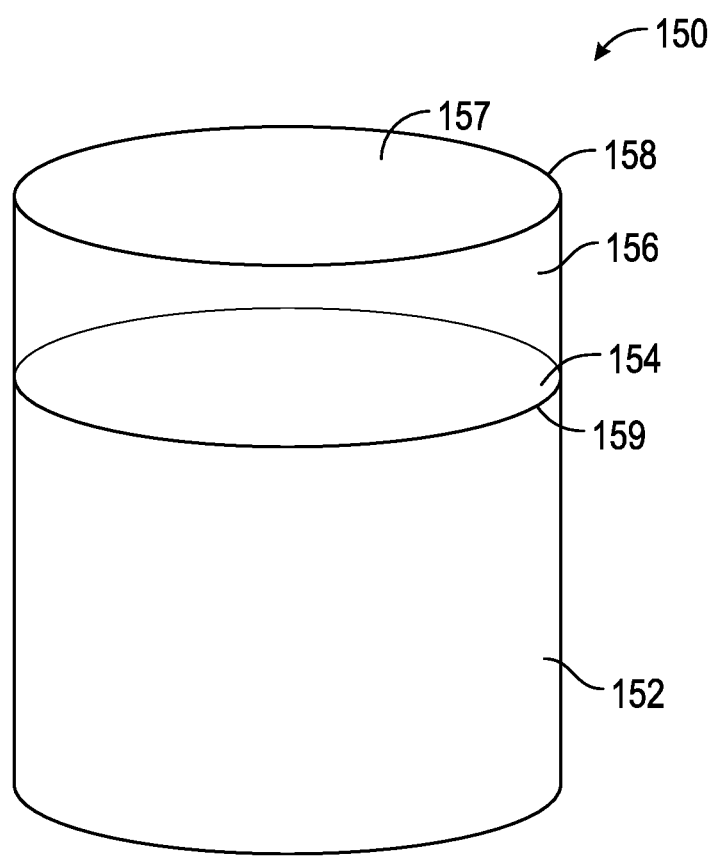
FIG. 2 shows a conventional cutting element.

FIG. 2 shows an example of a cutting element 150, where the cutting element 150 has a cylindrical cemented carbide substrate 152 having an end face or upper surface ("substrate interface surface") 154. An ultrahard material layer 156, also referred to as a cutting layer, has a top surface 157, also referred to as a working surface, a cutting edge 158 formed around the top surface, and a bottom surface, referred to as an ultrahard material layer interface surface 159. The ultrahard material layer 156 may be a polycrystalline diamond or polycrystalline cubic boron nitride layer. The ultrahard material layer interface surface 159 is bonded to the substrate interface surface 154 to form a planar interface between the substrate 152 and ultrahard material layer 156.

In one aspect, embodiments disclosed herein relate to cutting elements for a downhole tool having an ultrahard layer on a substrate at a non-planar interface. The cutting element may include a non-planar top surface, also referred to as a working surface, formed on the ultrahard layer and a non-planar interface surface. In particular, interface designs of the present disclosure may include a depression at or adjacent the peripheral edge of the interface surface in a region that corresponds to the cutting edge of the cutting element. Cutting elements of the present disclosure may be mounted to various types of downhole cutting tools, including but not limited to, drill bits, such as drag bits, reamers, and other downhole milling tools.

Cutting elements having a non-planar top or working surface may include, for example, a substantially hyperbolic paraboloid (saddle) shape or a parabolic cylinder shape, where the crest or apex of the cutting element extends across substantially the entire diameter of the cutting element. Further, interface surfaces may also include generally hyperbolic paraboloid shapes as well as generally parabolic cylinder shapes. However, as disclosed herein, other geometric shapes are also envisioned for both the working surface and/or interface surface.

Figure 3:
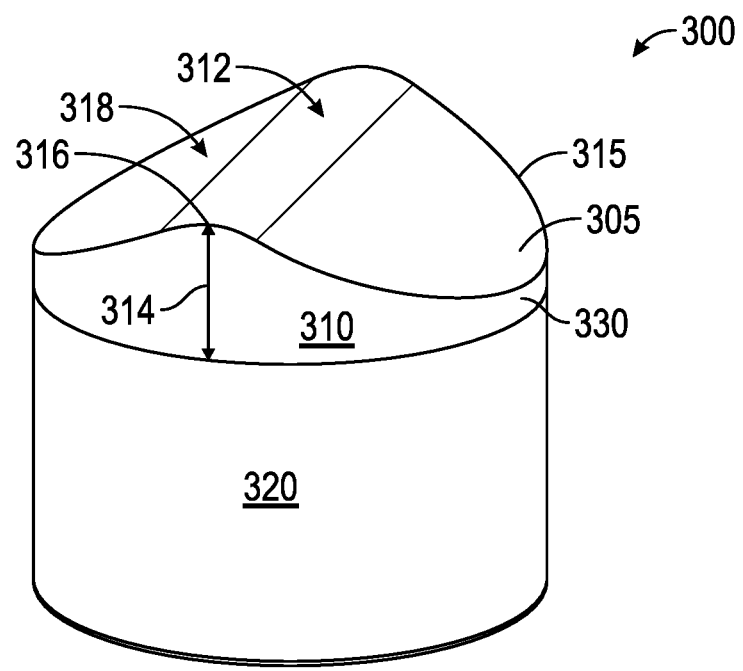
FIGS. 3-5 show a cutting element having a non-planar top surface.

For example, a cutting element 300 having a non-planar top surface 305 is shown in FIG. 3. Particularly, the cutting element 300 has an ultrahard layer 310 disposed on a substrate 320 at an interface 330, where the non-planar top surface 305 geometry is formed on the ultrahard layer 310. The ultrahard layer 310 has a peripheral edge 315 surrounding (and defining the bounds of) the top surface 305. The top surface 305 has a cutting crest 312 extending a height 314 above the substrate 320 (at the cutting element circumference), and at least one recessed region extending laterally away from cutting crest 312. As used herein, the crest refers to a portion of the non-planar cutting element that includes the peak(s) or greatest height(s) of the cutting element, which extends in a generally linear fashion towards a center of the cutting element, such as along a diameter of the cutting element. The presence of the crest 312 results in an undulating peripheral edge 315 having peaks and valleys. The portion of the peripheral edge 315, which is proximate the crest 312 forms a cutting edge portion 316. As shown, the cutting crest 312 may also extend across the diameter of the ultrahard layer, such that two cutting edge portions 316 are formed at opposite sides of the ultrahard layer. The top surface 305 further includes at least one recessed region 318 (two as illustrated) continuously decreasing in height in a direction away from the cutting crest 312 to another portion of the peripheral edge 315 that is the valley of the undulating peripheral edge 315. The cutting crest 312 and recessed regions 318 in the embodiment shown forms a top surface 305 having a parabolic cylinder shape, where the cutting crest 312 is shaped like a parabola that extends across the diameter of the ultrahard layer 310 and/or substrate 320. While not illustrated, at least a portion of the peripheral edge (for example, the cutting edge portion and extending around the portion of the edge that will come into contact with the formation for an expected depth of cut) may be beveled or chamfered. In one or more embodiments, the entire peripheral edge may be beveled, which may include a variable (in angle and/or width) chamfer or bevel around the circumference of the cutting element. In one or more embodiments, a cutting element may also have a radiused edge.

Figure 4:
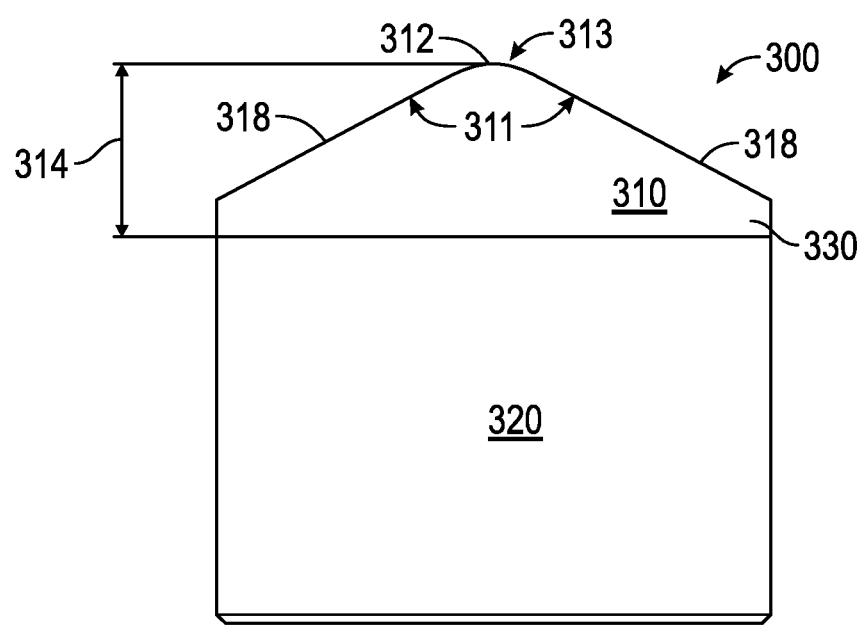

In one or more other embodiments, the cutting crest 312 may extend less than the diameter of the substrate 320 or even greater than the diameter of the substrate 320. For example, the ultrahard layer 310 may form a tapered sidewall at least proximate the cutting edge portion, for example, forming an angle with a line parallel to the axis of the cutting element that may range from −5 degrees (forming a larger diameter than the substrate 320) to 20 degrees (forming a smaller diameter than the substrate 320). Depending on the size of the cutting element, the height 314 of the cutting crest 312 may range, for example, from about 0.1 inch (2.54 mm) to 0.3 inch (7.62 mm). Further, unless otherwise specified, heights of the ultrahard layer (or cutting crests) are relative to the lowest point of the interface of the ultrahard layer and substrate. FIG. 4 shows a side view of the cutting element 300. As shown, the cutting crest 312 has a convex cross-sectional shape (viewed along a plane perpendicular to cutting crest length across the diameter of the ultrahard layer), where the uppermost point of the crest has a radius of curvature 313 that tangentially transitions into the laterally extending portion of the top surface 305 at an angle 311. According to embodiments of the present disclosure, a cutting element top surface may have a cutting crest with a radius of curvature ranging from 0.02 inches (0.5 mm) to 0.30 inches (7.6 mm), or in another embodiment, from 0.06 inches (1.5 mm) to 0.18 inches (4.6 mm). Further, while the illustrated embodiment shows a cutting crest 312 having a curvature at its upper peak, it is also within the scope of the present disclosure that the cutting crest 312 may have a plateau or substantially planar face along at least a portion of the diameter, axially above the recessed regions 318 laterally spaced from the cutting crest 312. Thus, in such an embodiment, the cutting crest may have a substantially infinite radius of curvature. In such embodiments, the plateau may have a radiused transition into the sidewalls that extend to form recessed regions 318. Further, in some embodiments, along a cross-section of the cutting crest 312 extending laterally into recessed regions 318, cutting crest 312 may have an angle 311 formed between the sidewalls extending to recessed regions 318 that may range from 110 degrees to 160 degrees. Further, depending on the type of upper surface geometry, other crest angles, including down to 90 degrees may also be used. Moreover, it is also understood for embodiments using plateaued cutting crest, the recessed regions may gradually extend away (either with curved or planar surfaces) from cutting crest, or there may be a stepped transition to recessed region. Further, while substrate 320) is illustrated as being cylindrical in nature, it is envisioned that the substrate (and diamond table) may be non-cylindrical, particularly, for example, to be shaped to accentuate or pronounce the cutting crest.

Figure 5:
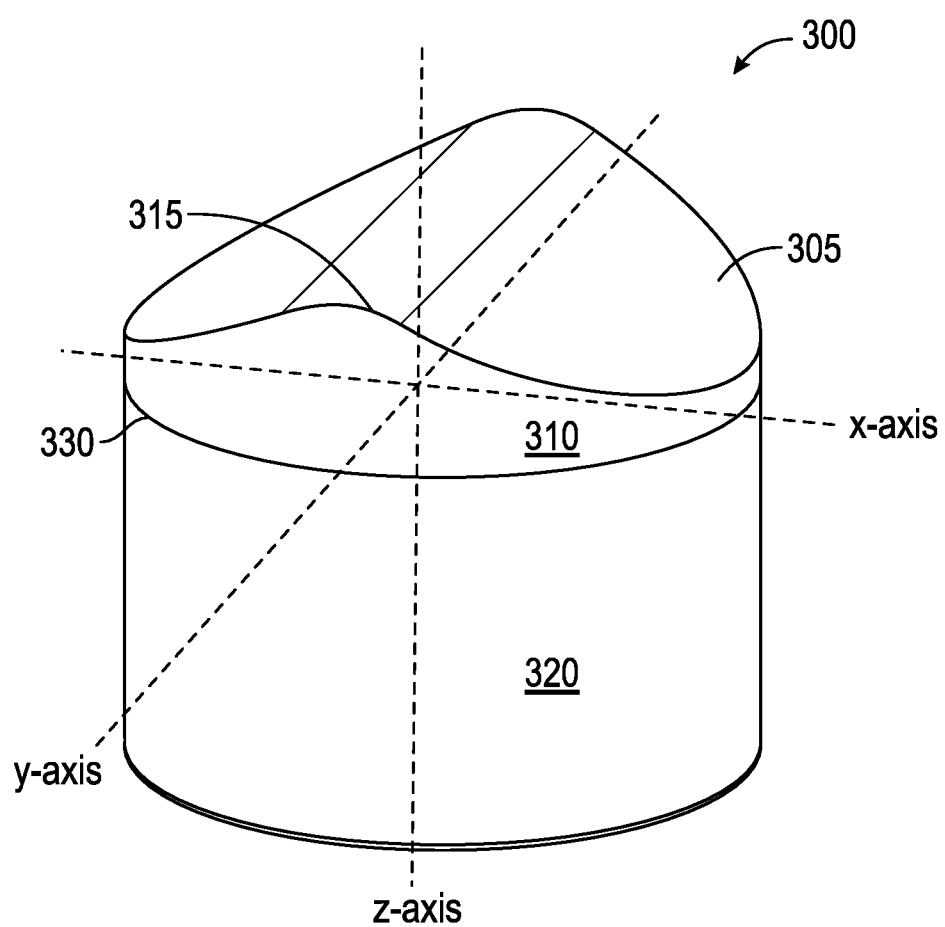
Figure 6:
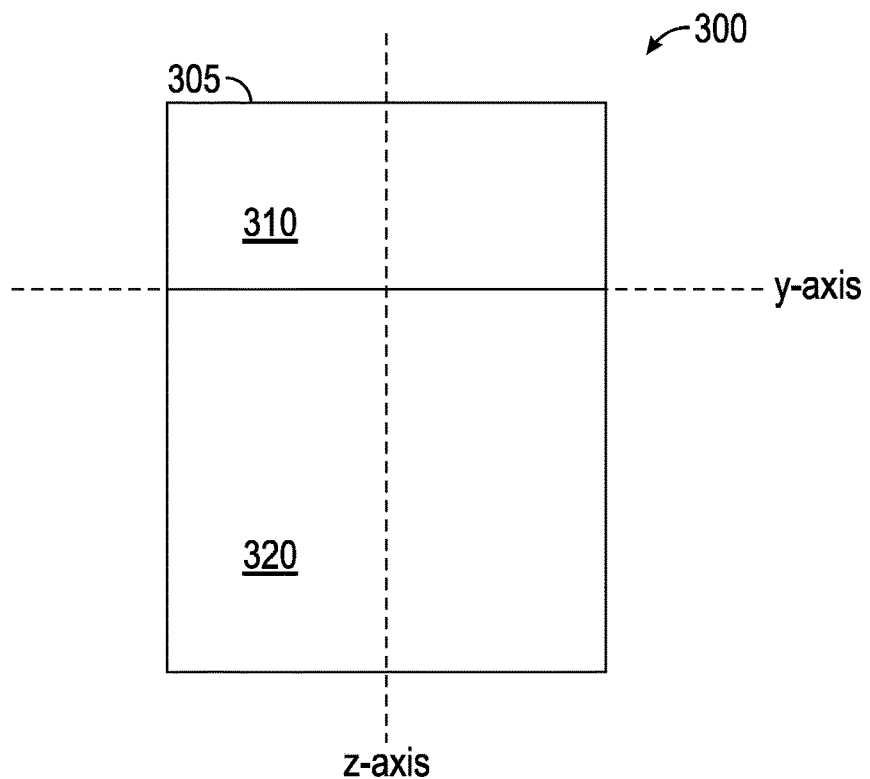
FIGS. 6 and 7 show cross-sectional views of a cutting element according to embodiments of the present disclosure.
Figure 7:
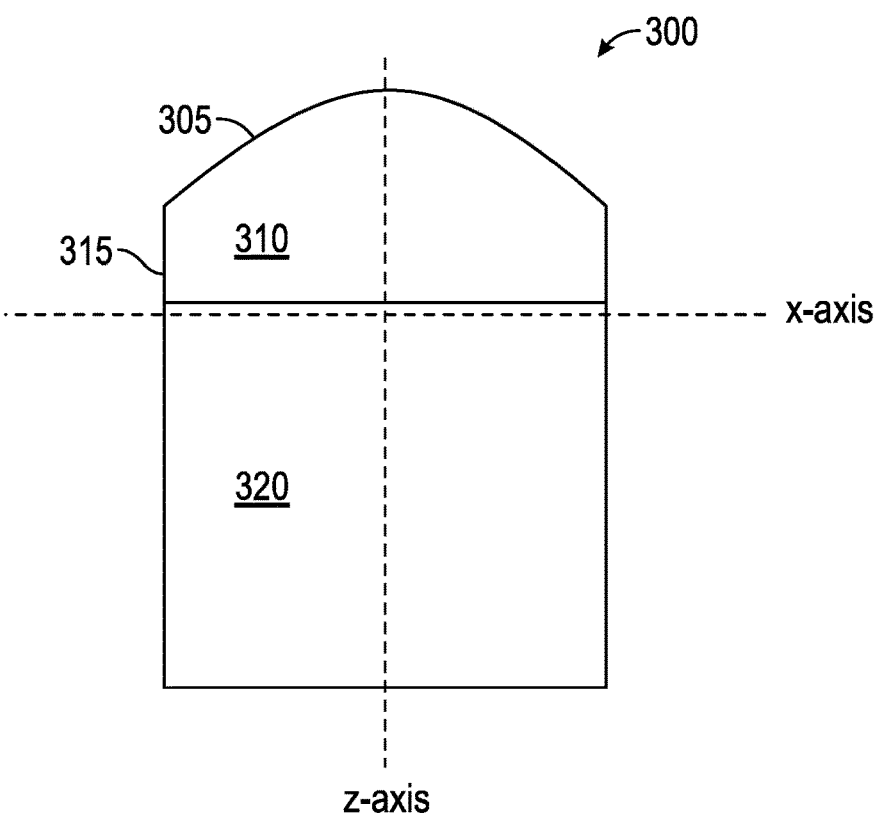

The geometry of a cutting element top surface may also be described with respect to an x-y-z coordinate system. For example, the cutting element shown in FIG. 3 is reproduced in FIG. 5 along an x-y-z coordinate system. The cutting element 300 has an ultrahard layer 310 disposed on a substrate 320 at an interface 330, and a longitudinal axis coinciding with the z-axis extending there through. The non-planar top surface 305 formed on the ultrahard layer 310 has a geometry formed by varying heights (where the height is measured along the z-axis) along the x-axis and y-axis. As shown, the greatest height (apex or peak) formed in the top surface (which may also be referred to as the cutting crest 312 in FIG. 3) extends across the diameter of the cutting element along the y-axis, such that the crest height extends from a first portion of the peripheral edge 315 to a second portion of the peripheral edge 315 opposite from the first portion. From the sake of convenience, the y-axis is defined based on the extension of the cutting element crest: however, one skilled in the art would appreciate that if defined differently, the remaining description based on the x-, y-, z-coordinate system would similarly vary. A cross-sectional view of the cutting element 300 along the intersection of the y-axis and z-axis is shown in FIG. 6. The y-z cross-sectional view of the cutting element may be referred to as the crest profile view as the uniformity, extension, etc., of the crest may be observed from such a cross-sectional view. As shown in the crest-profile view in FIG. 6, the top surface 305 along the crest height (i.e., crest profile) is substantially linear. A cross-sectional view of the cutting element 300 along the intersection of the x-axis and the z-axis is shown in FIG. 7, and may be referred to as the crest geometry view, as the curvature, etc., of the crest may be observed from such a cross-sectional view. As shown in the crest geometry view in FIG. 7, the top surface 305 peaks at the z axis (at the crest height), and continuously decreases from the crest height, moving along the x-axis in either direction towards the peripheral edge 315 of the cutting element (which may also be referred to as the recessed regions 318 in FIG. 3), such that the top surface 305 has a generally parabolic shape along the cross-section. Depending on the curvature of the cross-section illustrated in FIG. 7, the cross-section may also be described as the cross-section of a cone with a rounded apex, i.e., two angled sidewalls tangentially transitioning into the rounded apex (having the radius of curvature ranges described above). However, sidewalls with curvature, either concave or convex, may also be used. In this illustrated embodiment, the generally parabolic shape in the x-z cross-sectional view (or crest geometry view) extends along the y-axis, such that the three dimensional shape of the non-planar top surface 305 has parabolic cylinder shape.

Further, while some embodiments may have a uniform angle 311, radius of curvature for the cutting crest 312, or height 314 along the length of cutting crest 312, the present disclosure is not so limited. Rather, in one or more embodiments, the angle 311 may vary along the length of cutting crest 312. For example, angle 311 may increase from the cutting edge portion 316 extending along the y-axis towards the central or z-axis of the cutting element 300 and then decrease extending away from the central or z-axis towards the cutting edge portion 316 on the opposite side of the cutting element 300. Such difference in the angle may be up to 20 percent of the angle at the cutting edge portion 316 or up to 10 percent in some embodiments. In other embodiments, the angle 311 may increase extending away from the cutting edge portion 316 without decreasing (such as by reaching a peak angle extending at that peak angle for a length of cutting crest 312 or by continuously increasing along the length of cutting crest 312). Another variation on the angle 311 may include an angle 311 that is not symmetrical with respect to the y-z plane. That is, while the embodiment illustrated in FIGS. 3-7 shows an angle 311 that is bisected by the y-z plane, the present disclosure is not so limited. Rather, the angle 311 may be skewed with respect to the y-z plane so that on one side of the cutting crest 312, the top surface 305 extends laterally away from the cutting crest 312 to a first recessed region 318 at a more severe slope than on the other side of the cutting crest 312. It is also intended that this asymmetric angle 311 may vary along the length of the cutting crest 312.

In one or more embodiments, the radius of curvature of cutting crest 312 may increase from the cutting edge portion 316 extending along the length of cutting crest 312. For example, the radius of curvature may increase from the cutting edge portion 316 extending along the y-axis towards the central axis of the cutting element 300 and then decrease extending away from the central axis towards the cutting edge portion 316 on the opposite side of the cutting element 300. In other embodiments, the radius of curvature may increase extending away from the cutting edge portion 316 without decreasing (such as by reaching a peak radius of curvature and extending at that peak radius of curvature for a length of cutting crest 312 or by continuously increasing along the length of cutting crest 312).

Further, in one or more embodiments, the height 314 may vary along the length of cutting crest 312. For example, the height 314 may decrease (or increase) from the cutting edge portion 316 extending along the y-axis towards the central axis of the cutting element 300 and then decrease (or increase) extending away from the central axis towards the cutting edge portion 316 on the opposite side of the cutting element 300. In other embodiments, the height may decrease extending away from the cutting edge portion 316 without increasing (such as by reaching a minimum height and extending at that minimum height for a length of cutting crest 312 or by continuously decreasing along the length of cutting crest 312). In one or more embodiments, the lower height may have a differential of the greater height of less than about 50% of the greater height, or less than 40, 30, 20, or 10% in embodiments.

As mentioned above, top surface 305 may have an asymmetric angle 311: however, other variations on the top surface 305 that result in asymmetry about either and/or both of the x-Z, plane and y-z plane may exist. For example, the cutting crest 312 itself may lie on a plane that does not bisect the cutting element, i.e., the cutting crest 312 may be laterally offset from a central plane.

Referring now to FIGS. 11-15, various embodiments of a cutting element's interface surface are shown. These embodiments, which will be described in more detail below, may include an ultrahard layer disposed on a substrate at having a non-planar interface. Thus, in one or more embodiments, the ultrahard layer may be similar to those described, for example, in FIGS. 3-7 having a cutting crest. An upper surface of the substrate may also be non-planar. In some embodiments, the upper surface of the substrate (i.e. interface surface) may include a crest, one or more depressions, and a compressive stress hoop. Generally, a crest may be defined as a region of the substrate having the greatest height that extends in one direction across a diameter of the cutting element (or at least a portion of the diameter of the cutting element), where the substrate's upper surface generally decreases in height away from the crest in a direction generally perpendicular to the crest length. The crest of the substrate may be aligned with the cutting crest of the ultrahard layer, and in line with the one or more depressions. Thus, the one or more depressions may be disposed under the cutting crest (and also "aligned" with the cutting crest).

Figure 11A:
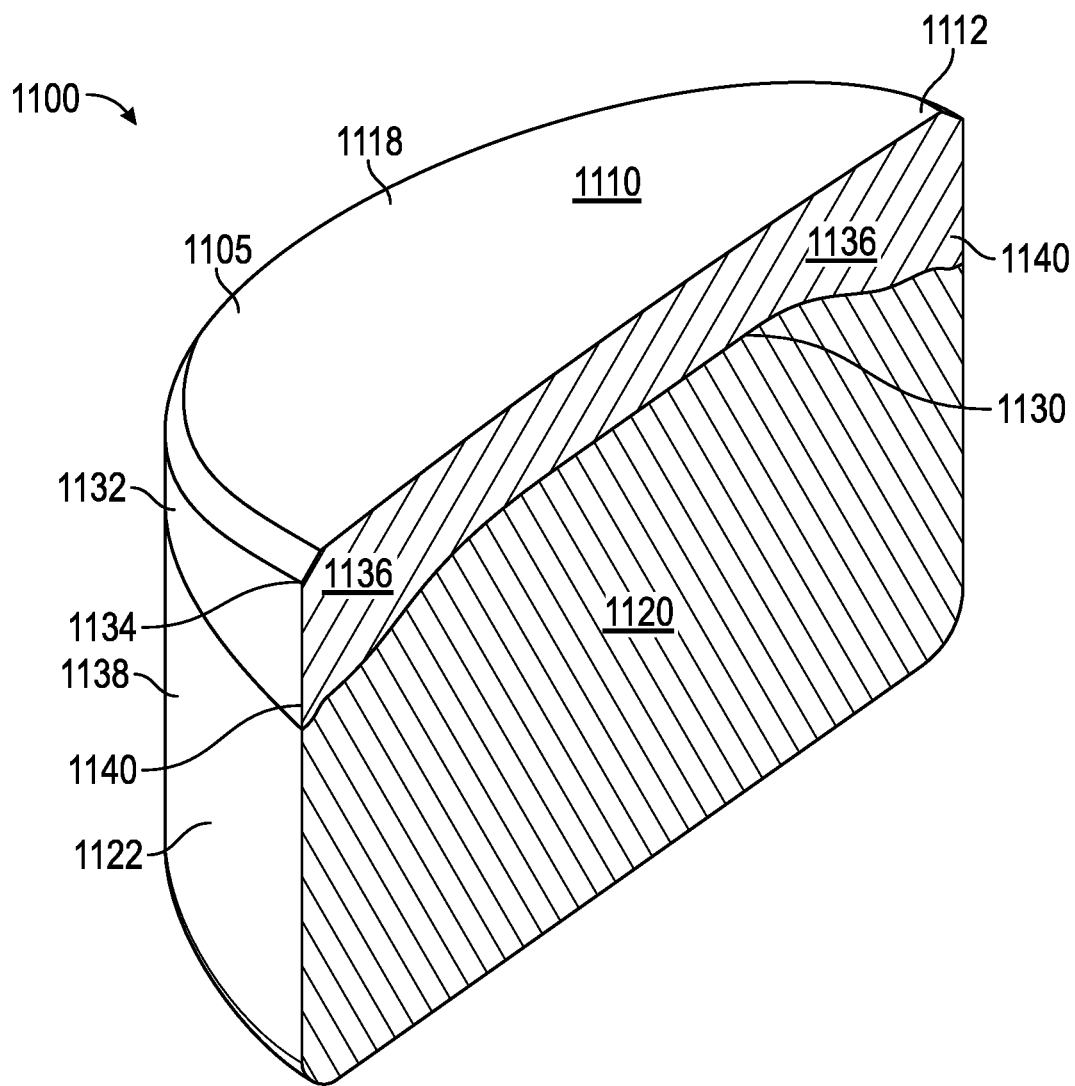
FIGS. 11A-11C show a cutting element in accordance with the present disclosure.
Figure 11B:
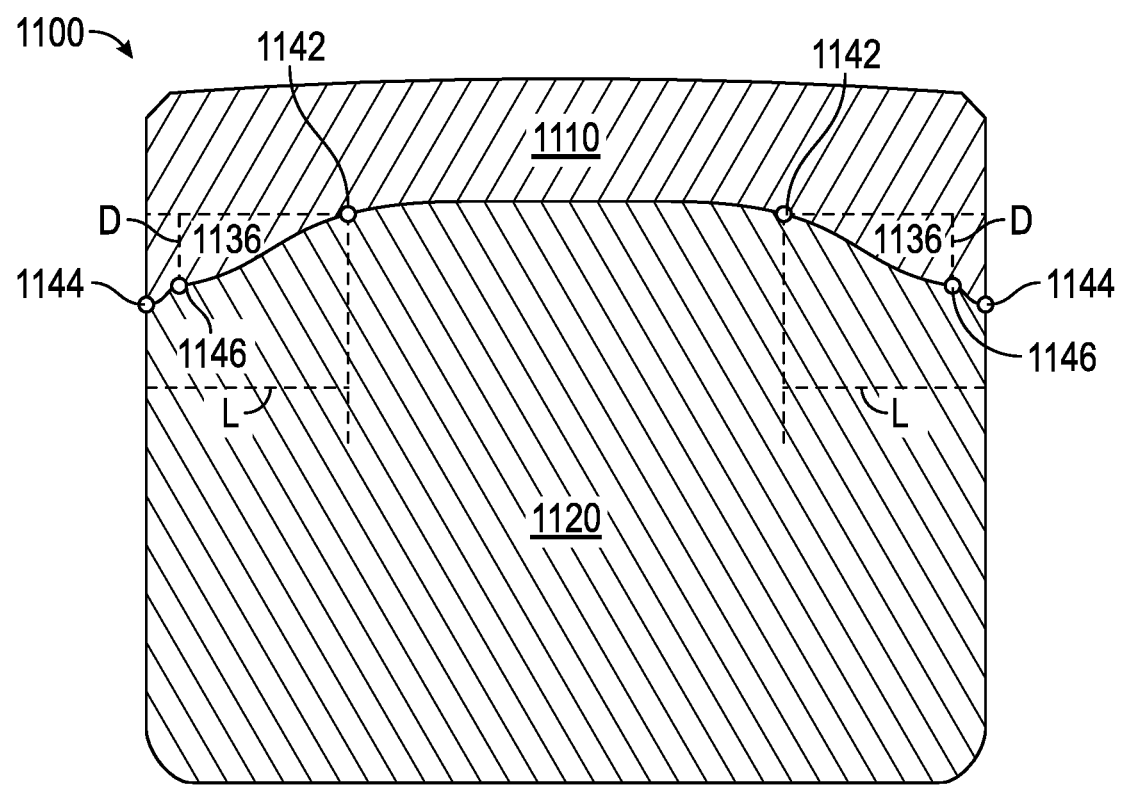
Figure 11C:
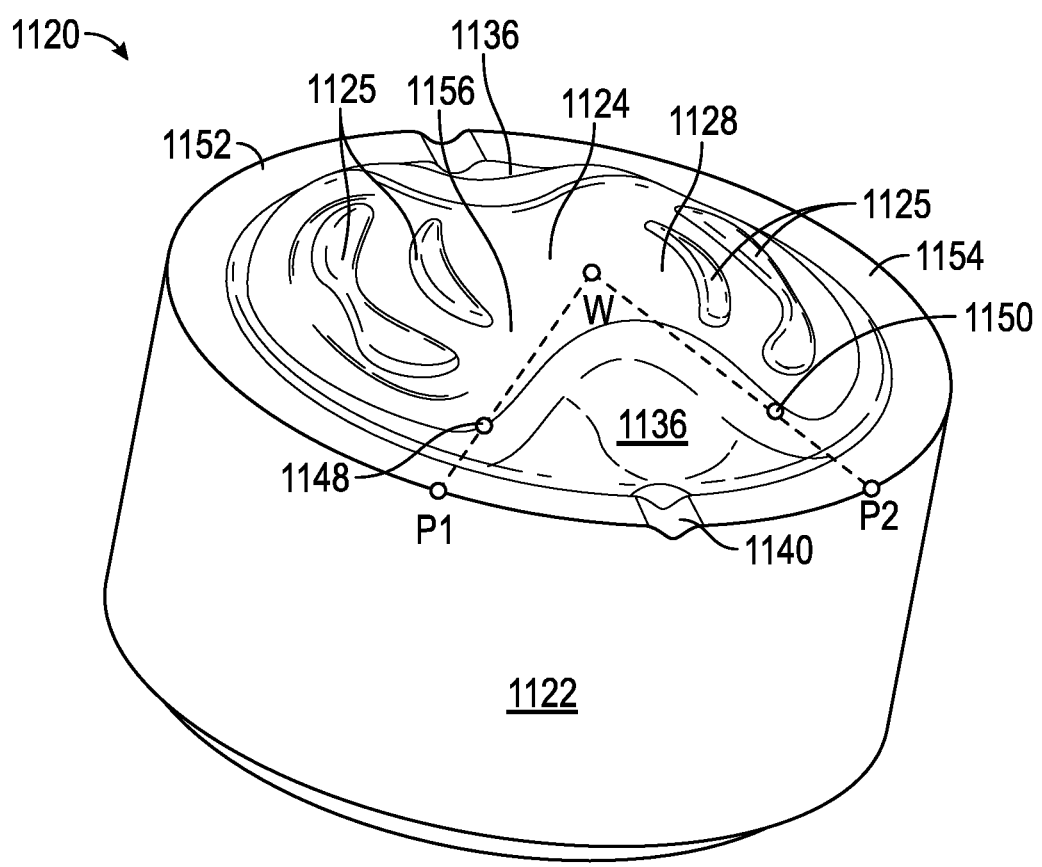

FIGS. 11A-11C illustrate a cutting element 1100, which may include an ultrahard layer 1110 disposed on a substrate 1120 at an interface 1130. FIGS. 11A and 11B show a cross-sectional view along the y-axis of the cutting element. The ultrahard layer 1110, may form a non-planar top surface 1105 that includes a cutting crest 1112 extending lengthwise along the y-axis (the cross-sectional view bisects the cutting crest 1112). The top surface 1105 may have the general shape of a parabolic cylinder, as described above. Extending laterally (along the x-axis) away from the cutting crest 1112, the ultrahard layer 1110 may include at least one recessed region 1118 formed by the continuous decreases in height of top surface 1105 in a direction away from the cutting crest 1112.

As can be most clearly seen in FIG. 11C, showing a perspective view of the substrate (without an ultrahard layer), an upper surface 1128 of the substrate 1120 may be non-planar. The substrate 1120 may include a crest 1124 that extends in substantial alignment with cutting crest 1112 (i.e., along the y-axis as illustrated). However, while cutting crest 1112 may extend along substantially along the entire diameter of cutting element 1100, in accordance with embodiments of the present disclosure, crest 1124 of substrate 1120 extends less than the entire diameter given the inclusion of depressions 1136 (discussed below) that that are in line with crest 1124 (and between crest 1124 and a peripheral edge 1138). Thus, the crest 1124 has a peak elevation that extends radially outward from a central axis of the cutting element 1100 in a direction that aligns with cutting crest 1112. From a top view of the substrate 1120, variations of which are shown, for example, in FIGS. 15A-D, the crest 1124 extends linearly (or substantially linearly) until intersecting the depression 1136. The crest 1124 may or may not have a uniform height. If the crest 1124 does not have a uniform height, the crest 1124 may have a convex curvature (a uniform or substantially uniform curvature in one or more embodiments), such that its ends (adjacent depression 1136) are lower than its peak height (proximate central or z-axis).

Thus, the upper surface 1128 may possess convex curvature extending in two directions, specifically, along both the x- and y-axis. The radius of curvature of the upper surface 1128 taken along the x-z cross-section may be smaller than the radius of curvature taken along the y-z cross-section. In other words, the radius of curvature along the crest 1124 may be larger than the radius of curvature formed by the upper surface 1128 extending laterally away from the crest 1124. The curvature along crest 1124 may allow for a thicker ultrahard layer 1110 approaching the cutting edge portion 1134 of the peripheral edge 1132 of the ultrahard layer 1110 and may provide a smoother transition into depression 1136. Further, it is understood that there may be a single curvature along each cross-section, or the curvature may be complex. It is also understood that the curvature may vary across different cross-sections parallel to each of the x-z and y-z cross-sections.

The upper surface 1128 may also include one or more depressions 1136. The depressions 1136 may be formed along the y-axis, in line with the crest 1124. In one or more embodiments, the depressions 1136 may be proximate a peripheral edge 1138 of the substrate 1120. The depressions 1136 may or may not intersect the peripheral edge 1138. A depression 1136 may be proximate but not intersect the peripheral edge 1138 if it is spaced a small distance from the peripheral edge 1138, which may be a distance less than 20% of the substrate radius. On the other hand, a depression 1136 intersects the peripheral edge 1138 when the peripheral edge 1138 has a complex (or undulating) curvature adjacent depression 1136. When depression 1136 intersects peripheral edge 1138, the thickness of ultrahard layer 1110 at the cutting edge (where the cutting crest reaches the peripheral edge of the top surface), which is over depression 1136, is increased. In particular, depression 1136 has a depth, and ultrahard layer 1110 has a thickness, such that the peripheral edge 1138 of the non-planar upper surface 1128 of the substrate 1120 is at a minimum height at depression 1136.

Figure 14A:
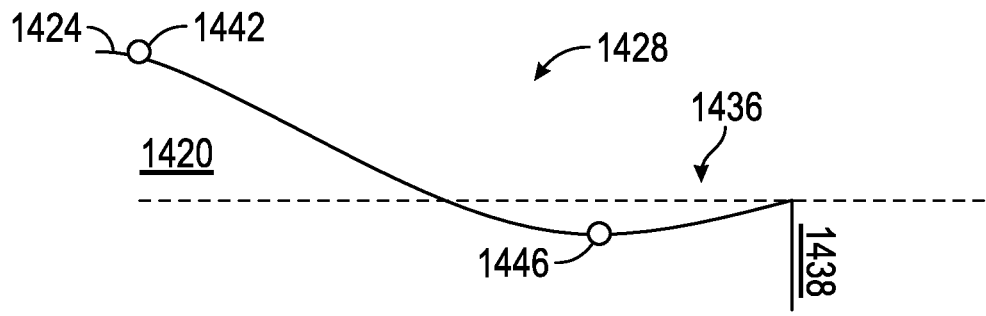
FIGS. 14A-14C show cross-sectional views of a cutting element according to embodiments of the present disclosure.
Figure 14B:
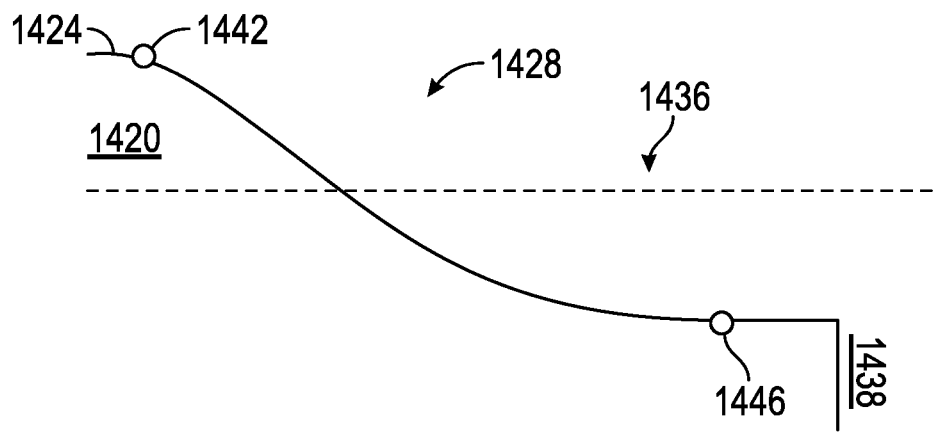
Figure 14C:
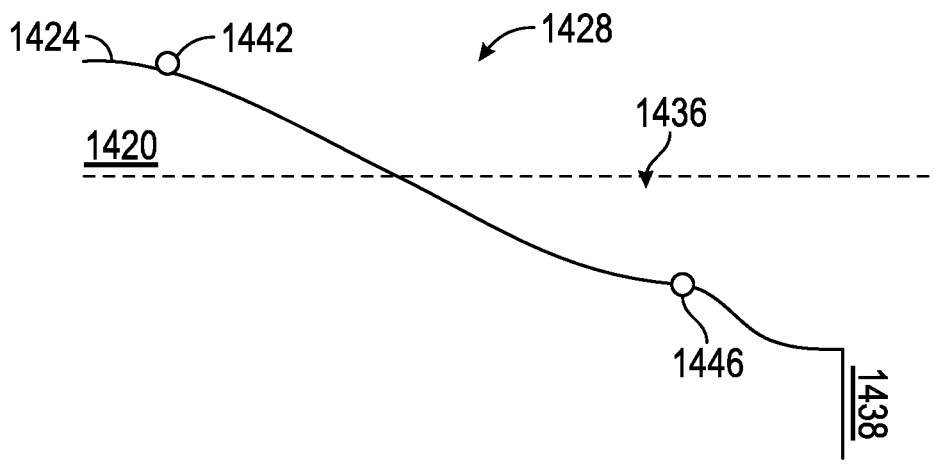

As can be best seen in FIG. 11B, the depressions 1136 may include one or more curvatures different than the curvature of the crest 1124 along the y-axis such that the geometry of the upper surface 1128 may have a complex curvature in the y-z cross-sectional plane (which bisects crest 1124 along its length). In one or more embodiments, the complex curvature may include at least 2 distinct radii of curvature between a central axis and the peripheral edge 1138 (or at least 3 or 4 distinct radii in more particular embodiments). For example, the depressions 1136 may include a region which slopes downward more sharply along the y-axis than the crest 1124. As shown in FIGS. 11A-11C, the depressions 1136 may also include a region that slopes downward more gradually along the y-axis as depression 1136 nears the peripheral edge 1138. Examples of curvature of an upper surface of a cutting element along the y-axis are shown in FIGS. 14A-14C and described in more detail below. In particular embodiments, the depressions 1136 may transition from convex curvature to concave curvature. The depressions 1136 may also include one or more curvatures in the x-direction (including transitioning from convex to concave back to convex). For example, the depressions 1136 may include different curvatures in the x-direction at different distances along the y-axis. The depressions 1136 may include convex, concave, and linear curvatures.

In some embodiments, the depressions 1136 may include a rim 1156. The rim 1156 may be a curve(s), line segment(s), or combination of curve(s) and line segment(s) at which the curvature of the upper surface 1128 in the region of the crest 1124 and the depressed regions 1126 changes to a curvature of the depression 1136. The rate of change of the slope of a line tangent to the upper surface 1128 may change at the rim 1156. The tangent point 1142 may lie along the rim 1156. Examples of rim of depressions are illustrated in FIGS. 15A-15D and described in more detail below.

The depressions 1136 may have a length L, a width measured by an arc W, and a depth D. The length L and the depth D are illustrated in FIG. 11B. The arc W is illustrated on FIG. 11C. The length L of a depression 1136 may be measured along the y-axis, from a tangent point 1142 of the depression 1136 to an outermost point 1144 of the depression 1136. The tangent point 1142 may be a point along the y-axis at which the curvature of the upper surface 1128 changes from the curvature of the crest 1124 to a different curvature. In other words, the rate of change of a tangent line of the upper surface 1128 along the y-axis may change at the tangent point 1142. The outermost point 1144 is a point along the y-axis furthest from the center of the upper surface 1128, which has the lowest height. In some embodiments, where depression 1136 intersects peripheral edge 1138, it is understood that the outermost point 1144 may lie on the peripheral edge 1138 of the substrate 1120. However, in other embodiments, the outermost point 1144 may be spaced radially inward from the peripheral edge 1138. In some embodiments, the length L may be at least 0.09, 1, 2, 5, 10, 15, 20, or 25 percent of the radius of the substrate 1120. In some embodiments, the length L may be at most 20, 25, 40, 50, 75, 85, 90, or 96 percent of the radius of the substrate 1120.

The depth D of a depression 1136 may be measured parallel to the z-axis, from the tangent point 1142 to a lowest point 1146 of the depression 1136. The lowest point 1146 may be a point within the depression 1136, whose depth is greater than or equal to the depth of all other points within the depression 1136. In some embodiments, the depression may include more than one lowest point 1146. For example, an entire region within the depression 1136 may be at an equal, greatest depth. The lowest point may or may not lie along the y-axis. Points within the dimple 1140 (discussed below) may be excluded from the selection of a lowest point 1146 within the depression 1136.

Each of the depressions 1136 may optionally include a dimple 1140. Each dimple 1140 may include a small downward protrusion, which may be used to align the cutting element 1100. For example, a dimple 1140 may be used to align a cutting element 1100 when it is installed in a drill bit to ensure the cutting crest 1112 is oriented in the proper direction. The dimple 1140 may be formed proximate or adjacent the peripheral edge 1138 of the substrate 1120.

As described above, the substrate 1120 and the ultrahard layer 1110 may abut at the interface 1130. The ultrahard layer 1110 may extend into the depressions 1136, such that the ultrahard layer 1110 also has a depth D within the depression 1136. In some embodiments, the depth D of the ultrahard layer 1110 may be at least 15, 25, 50, 75, 100, 110, 115, 120, or 125 percent of the thickness of the ultrahard layer 1110 at the z-axis of the cutting element 1100. In some embodiments, the depth D of the ultrahard layer 1110 may be at most 50, 75, 90, 100, 120, 125, 140, 150, 175, 190, or 200 percent of the thickness of the ultrahard layer 1110 at the z-axis of the cutting element 1100.

The width of a depression 1136 may be measured as an arc length between a first lateral deviation point 1148 and a second lateral deviation point 1150. As defined herein, a deviation point is where the overall curvature begins to change or deviate substantially (where a rate of change is greater than 1 or 2) and may optionally be an inflection point. As discussed above, the upper surface 1128 of the substrate 1120 may include a simple curvature along both the x-axis and along the y-axis. The portion of the upper surface 1128 lateral to the crest 1124 may have a curvature defined by those two curvatures. As further discussed above, the depressions 1136 may include a complex curvature which is different than the curvature of the rest of the upper surface 1128. The lateral deviation points 1148, 1150 may be defined as the points farthest from the y-axis on either side of a depression 1136 at which the curvature changes from the simple curvature of the upper surface 1128 to a different curvature. An arc W may be defined along the peripheral edge 1138 of the substrate 1120, from a first point P1, defined as the point at which a line intersecting the z-axis and the first lateral deviation point 1148 intersects the peripheral edge 1138, to a second point P2, defined as the point at which a line intersecting the z-axis and the second lateral deviation point 1150 intersects the peripheral edge 1138. The width of the depression may be defined as the arc length of arc W. In some embodiments, the width may be at least 5, 8, 10, 12, 15, 20, 30, or 45 degrees. In some embodiments, the width may be at most 20, 30, 45, 70, 90, 120, 140, or 150 degrees.

The upper surface 1128 of the substrate 1120 may also include a compressive stress hoop 1152. The compressive stress hoop 1152 may include an annular surface or hoop extending around the upper surface 1128 adjacent to the peripheral edge 1138 of the upper surface 1128. A hoop is formed based on the change in the geometry from the upper surface 1128 leading into the compressive stress hoop 1152. Such geometry may be referred to as a compressive stress hoop due to the resulting compressive stresses that form in the ultrahard layer 1110 due to the presence of the geometry "hoop" adjacent the peripheral edge 1138 of the substrate. That is, during HTHP sintering during the formation of the ultrahard layer 1110 atop substrate 1120, the compressive stress hoop 1152 in the substrate induces a concentration of compressive stresses (and reduces tensile stresses) to form in the adjacent portion(s) of the ultrahard layer 1110. In particular, compressive stress may be redistributed into the "work zone" of the diamond layer and move the tensile stresses away from (or reduce such tensile stresses from) such work zone. The compressive stress hoop 1152 may extend into the depressions 1136 if the depressions 1136 extend to the peripheral edge 1138 of the substrate 1120 or may at least extend around at least 90, 105, or 120 degrees of the upper surface 1128. If the depressions 1136 do not extend to the peripheral edge 1138 of the substrate 1120, the compressive stress hoop 1152 may extend into or around the depressions 1136.

The compressive stress hoop 1152 may have a constant annular radius or a varied annular radius. If the annular radius is varied, the compressive stress hoop 1152 may be narrowest at a point about 90 degrees from a center point of at least one of the depressions 1136 (or equidistant between two depressions). The annular radius of the compressive stress hoop 1152 may increase towards each of the depression 1136. In some embodiments, an annular radius of the compressive stress hoop 1152 at its narrowest point may be at least 1, 2, 3, 5, 8, 10, or 15 percent of the radius of the substrate 1120. In some embodiments, the annular radius of the compressive stress hoop 1152 at its narrowest point may be at most 10, 15, 20, 25, or 50 percent of the radius of the substrate 1120.

The compressive stress hoop 1152 may include a planar or curved surface. In some embodiments, the compressive stress hoop 1152 may be perpendicular (or otherwise angled such as within 10 degrees of perpendicular to the z-axis) to the z-axis of the cutting element 1100 at a point about 90 degrees from a center point of at least one of the depressions 1136. The surface of the compressive stress hoop 1152 may be curved as it merges into the depressions 1136. The compressive stress hoop 1152 may have a different curvature than the adjacent portions of the upper surface 1128, such that an angled or curved deviation ring 1154 is formed on an inner edge of the compressive stress hoop 1152. One skilled in the art will recognize that a cutting element in accordance with these embodiments may be formed without a compressive stress hoop without departing from the scope of this disclosure.

The upper surface 1128 may also include a plurality of protrusions 1125. In the illustrated embodiment, the protrusions 1125 are a plurality of generally crescent shaped protrusions 1125 (having a general curvature along the length thereof with rounded ends (rather than a conventional crescent which comes to a point at its ends)). However, protrusions may be of other shapes, including generally tear-drop shaped (having one rounded end and one end coming to a point), or other elongate (longer than wide) shapes, such as ovals, fabiforms, or reniforms (generally bean-shaped, rounded but having an indentation on one side) but may also be non-elongate shapes such as circles, etc. As shown, the curvature of the crescent-shaped protrusions 1125 are bowed outwards from the y-axis away from crest 1124. A plurality of protrusions 1125 are on either side of crest 1124 on the substrate upper surface 1128 extending towards depressed regions 1126. With such orientation, the length of the plurality of protrusions are generally aligned with (substantially parallel or within 20 degrees of) the length of crest 1124. In one or more embodiments, the protrusions 1125 extend a height ranging from about 0.010 to 0.050 inches (0.25 to 1.3 mm). In some embodiments, the protrusions 1125 extend a height that is equal to or greater than about 5%, about 10%, about 15%, or about 20%, and less than or equal to about 50%, about 45%, about 40%, or about 35% the smallest thickness of the ultrahard layer 1110. One skilled in the art may readily envision that an upper surface 1128 of a substrate 1120 may include protrusions differing in shape, dimension, or number from those explicitly described, or may not include protrusions at all without departing from the scope of this disclosure.

One skilled in the art will recognize that a substrate 1120 described with respect to FIGS. 11A-11C may be used in combination with an ultrahard layer having any shape known in the art without departing from the scope of this disclosure. Such an ultrahard layer may or may not include a cutting crest or may include more than one cutting crest, as described for example in U.S. Patent Application No. US20150259988, which is assigned to the present assignee and herein incorporated in its entirety. Further, one skilled in the art will readily envision that if such a substrate 1120 is used with an ultrahard layer including more than one cutting crest, the substrate may be modified to include additional crests and/or depressions.

Figure 12A:
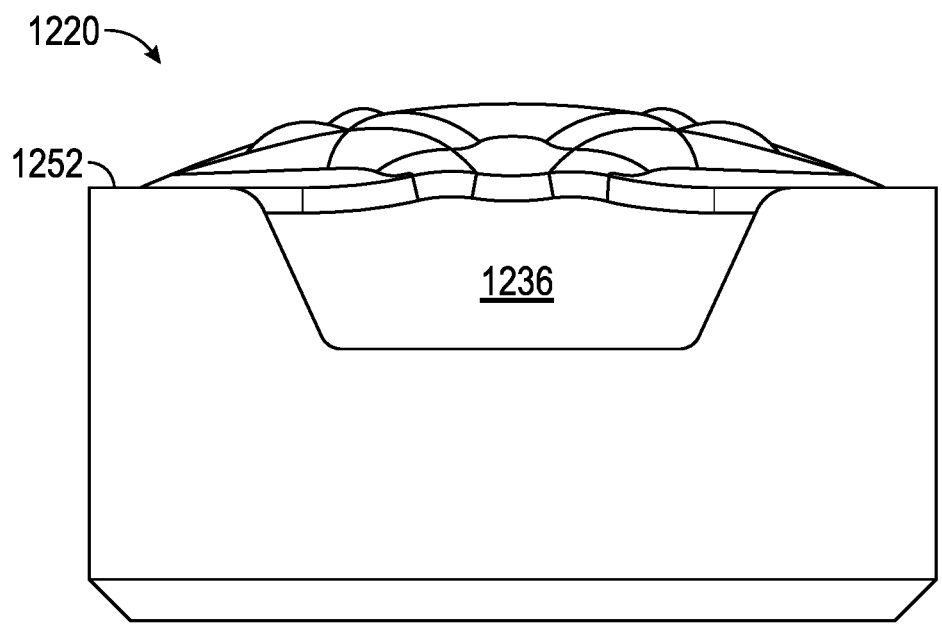
FIGS. 12A-12D show a cutting element in accordance with the present disclosure.
Figure 12B:
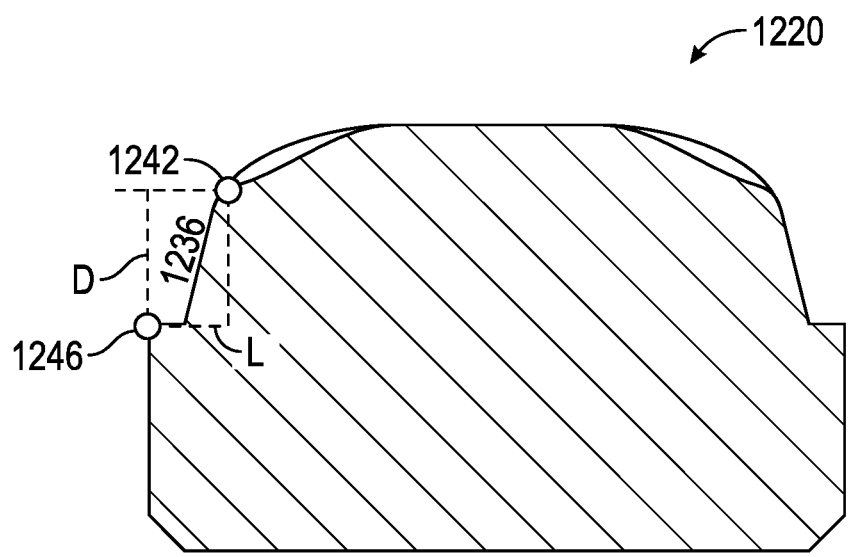
Figure 12C:
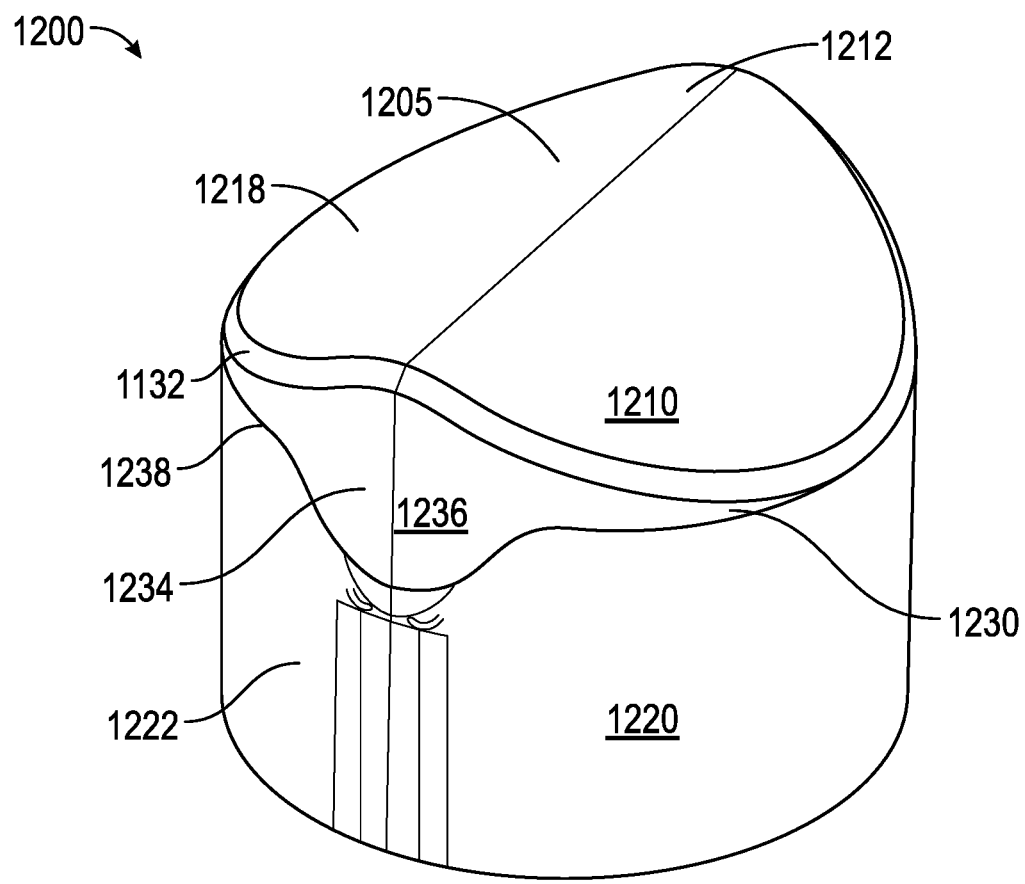
Figure 12D:
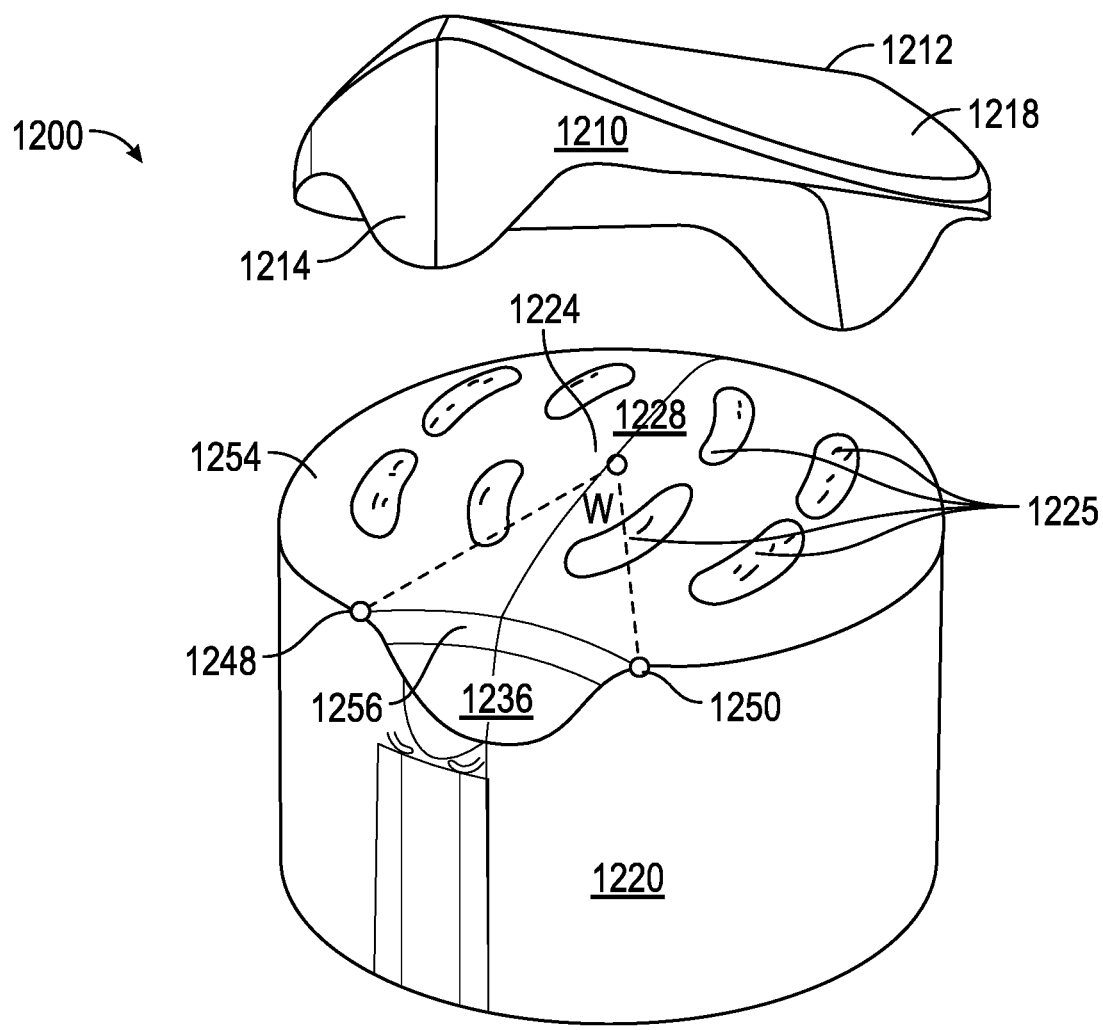

FIGS. 12A-12D illustrate embodiments of a cutting element 1200, which may include an ultrahard layer 1210 disposed on a substrate 1220 at an interface 1230. FIGS. 12A-12B illustrate a first embodiment, while FIGS. 12C-12D illustrate a second, slightly different embodiment. In these embodiments, the ultrahard layer 1210, may form a non-planar top surface 1205 that includes a cutting crest 1212 extending lengthwise along the y-axis. The top surface 1205 may have the general shape of a parabolic cylinder, as described above. Extending laterally (along the x-axis) away from the cutting crest 1212, the ultrahard layer 1210 may include at least one recessed region 1218 formed by the continuous decreases in height of top surface 1205 in a direction away from the cutting crest 1212.

As can be most clearly seen in FIG. 12D (showing an exploded view with ultrahard layer 1210 separated from substrate 1220), an upper surface 1228 of the substrate 1220 may be non-planar. In some embodiments, the substrate 1220 may include a crest 1224 that extends in substantial alignment with cutting crest 1212 (i.e., along the y-axis as illustrated). However, while cutting crest 1212 may extend along substantially along the entire diameter of cutting element 1200, in accordance with embodiments of the present disclosure, crest 1224 of substrate 1220 extends less than the entire diameter given the inclusion of depressions 1236 (discussed below) that that are in line with crest 1224 (and between crest 1224 and a peripheral edge 1238). Thus, the crest 1224 has a peak elevation that extends radially outward from a central axis of the cutting element 1200 in a direction that aligns with cutting crest 1212. From a top view of the substrate 1220, the crest 1224 extends linearly (or substantially linearly) until intersecting the depression 1236. The crest 1224 may or may not have a uniform height. If the crest 1224 does not have a uniform height, the crest 1224 may have a uniform convex curvature, such that its ends (adjacent depressions 1236) are lower than its peak height (proximate central or z-axis).

The upper surface 1228 may possess convex curvature extending in two directions, specifically, along both the x- and y-axis. The radius of curvature of the upper surface 1228 taken along the x-z cross-section may be smaller than the radius of curvature taken along the y-z cross-section. In other words, the radius of curvature along the crest 1224 may be larger than the radius of curvature formed by the upper surface 1228 extending laterally away from the crest 1224. The curvature along crest 1224 may allow for a thicker ultrahard layer 1210 approaching the cutting edge portion 1234 of the peripheral edge 1232 of the ultrahard layer 1210 and may provide a smoother transition into depression 1236. Further, it is understood that there may be a single curvature along each cross-section, or the curvature may be complex. It is also understood that the curvature may vary across different cross-sections parallel to each of the x-z and y-z cross-sections.

The upper surface 1228 may also include one or more depressions 1236. The depressions 1236 may be formed along the y-axis, in line with the crest 1224. In one or more embodiments, the depressions 1236 may be proximate a peripheral edge 1238 of the substrate 1220. The depressions 1236 may or may not intersect the peripheral edge 1238. As illustrated, depression 1236 intersects the peripheral edge 1238 when the peripheral edge 1238 has a complex (or undulating) curvature adjacent depression 1236. However, as discussed above, it is also envisioned that depression may be spaced away from edge 12361238 yet still proximate. When depression 1236 intersects peripheral edge 1238, the thickness of ultrahard layer 1210 at the cutting edge (where the cutting crest reaches the peripheral edge of the top surface), which is over depression 1236, is increased. In particular, depression 1236 has a depth, and ultrahard layer 1210 has a thickness, such that the peripheral edge 1238 of the non-planar upper surface 1228 of the substrate 1220 is at a minimum height at depression 1236.

As can be best seen in FIG. 12D, the depressions 1236 may include one or more curvatures different than the curvature of the crest 1224 along the y-axis such that the geometry of the upper surface 1228 may have a complex curvature in the y-z cross-sectional plane (which bisects crest 1224 along its length). In one or more embodiments, the complex curvature may include at least 2 distinct radii of curvature between a central axis and the peripheral edge 1238 (or at least 3 or 4 distinct radii in more particular embodiments). For example, the depressions 1236 may include a region which slopes downward more sharply along the x-axis than the crest 1224. In some embodiments, this downward slope may be linear or nearly linear. As shown in FIGS. 12B the depressions 1236 may include a slightly curved inner edge that may be at least substantially parallel to the y-axis. Thus, compared to the embodiments illustrated in FIGS. 14A-C, depression 1236 may be much shallower, having a significantly reduced length. The depressions 1236 may also include one or more curvatures in the x-direction. The depressions 1236 may include different curvatures in the x-direction at different distances along the y-axis. The depressions 1136 may include convex, concave, and linear curvatures.

Figure 15A:
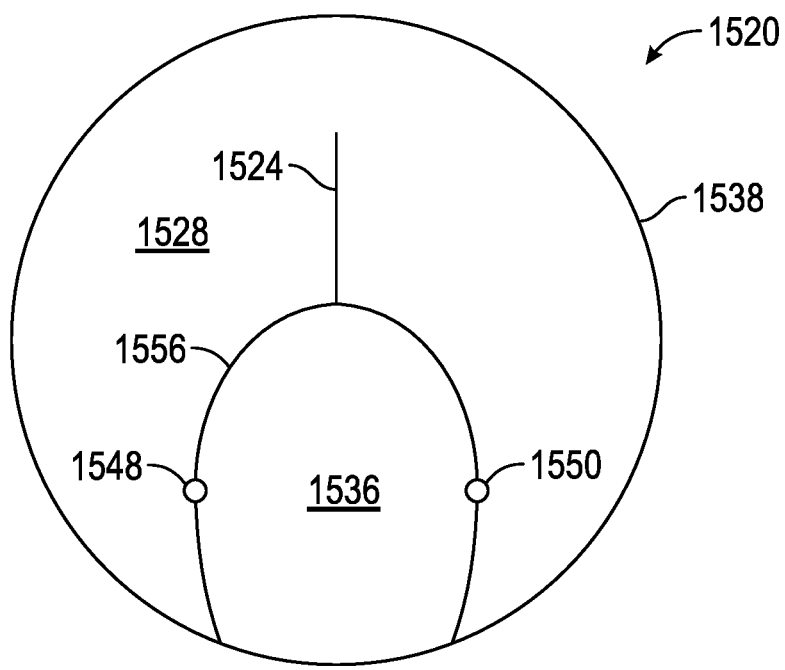
FIGS. 15A-15D show top views of a cutting element according to embodiments of the present disclosure.
Figure 15B:
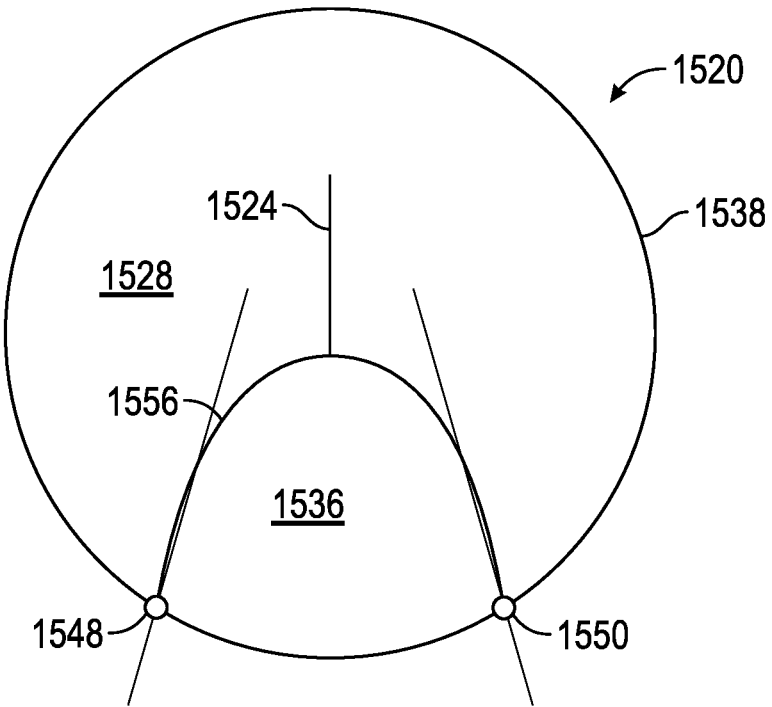
Figure 15C:
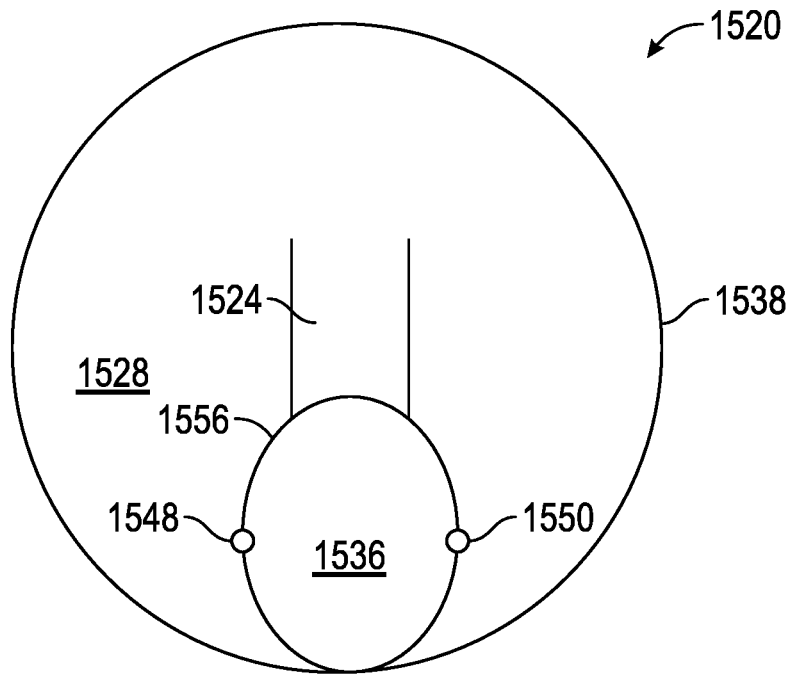

In some embodiments, the depressions 1236 may include a rim 1256, which is considered the transition between depression 1236 and the rest of the upper surface 1228. The rim 1256 may be a curve(s), line segment(s), or combination of curve(s) and line segment(s) at which the curvature of the upper surface 1228 in the region of the crest 1224 and the depressed regions 1226 changes to a curvature of the depression 1236. The rate of change of the slope of a line tangent to the upper surface 1228 may change at the rim 1256. The tangent point 1242 may lie along the rim 1256. Examples of rim of depressions are illustrated in FIGS. 15A-15C and described in more detail below. Further, while the embodiments shown in FIGS. 12A-B and 12C-D are similar, they are distinct with respect to the geometric shape of the ultrahard material 1114 that extends down below cutting crest, where the embodiment in FIG. 12A-B includes a "polygonal" extension below cutting crest (to fill in depression 1236) while the embodiment in FIG. 12C-D has a constant curvature to the ultrahard extension 1214

The depressions 1236 may have a length L, a width measured by an arc W, and a depth D. The length L and the depth D are illustrated in FIG. 12B. The arc W is illustrated on FIG. 12D.

The length L of a depression 1236 may be measured along the y-axis, from a tangent point 1242 of the depression 1236 to an outermost point 1244 of the depression 1236. The tangent point 1242 may be a point along the y-axis at which the curvature of the upper surface 1228 changes from the curvature of the crest 1224 to a different curvature. In other words, the rate of change of a tangent line of the upper surface 1128 along the y-axis may change at the tangent point. The outermost point 1244 is a point along the y-axis furthest from the center of the upper surface 1228, which has the lowest height. In some embodiments, it is understood that the outermost point 1244 may lie on the peripheral edge 1238 of the substrate 1220. In one or more embodiments, the length L may be at least 9, 10, 15, 20, 25, 30 or 50 percent of the radius of the substrate 1220 and at most 40, 50, 70, or 100 percent of the radius of the substrate 1220.

The depth D of a depression 1236 may be measured parallel to the z-axis, from the tangent point 1242 to a lowest point 1246 of the depression 1236. The lowest point 1246 may be a point within the depression 1236, whose depth is greater than or equal to the depth of all other points within the depression 1236. In some embodiments, the depression may include more than one lowest point 1246. For example, an entire region within the depression 1236 may be at an equal, greatest depth. The lowest point may or may not lie along the y-axis.

As described above, the substrate 1220 and the ultrahard layer 1210 may abut at the interface 1230. The ultrahard layer 1210 may extend into the depressions 1236, such that the ultrahard layer 1210 also has a depth D within the depression 1236. In some embodiments, the depth D of the ultrahard layer 1210 may be at least 15, 25, 50, 75, 100, 110, 120, 130, or 140 percent of the thickness of the ultrahard layer 1210 at the z-axis of the cutting element 1200. In some embodiments, the depth D of the ultrahard layer 1210 may be at most 140, 150, 175, 200, or 250 percent of the thickness of the ultrahard layer 1210 at the z-axis of the cutting element 1200.

The width of a depression 1236 may be measured as an arc length between a first lateral deviation point 1248 and a second lateral deviation point 1250. As discussed above, the upper surface 1228 of the substrate 1220 may include a simple curvature along both the x-axis and along the y-axis. The portion of the upper surface 1228 lateral to the crest 1224 may have a curvature defined by those two curvatures. As further discussed above, the depressions 1236 may include a complex curvature which is different than the curvature of the rest of the upper surface 1228. The lateral deviation points 1248, 1250 may be defined as the points farthest from the y-axis on either side of a depression 1136 at which the curvature changes from the simple curvature of the upper surface 1228 to a different curvature. An arc W may be defined along the peripheral edge 1238 of the substrate 1220, from a first point P1, defined as the point at which a line intersecting the z-axis and the first lateral deviation point 1248 intersects the peripheral edge 1238, to a second point P2, defined as the point at which a line intersecting the z-axis and the second lateral deviation point 1250 intersects the peripheral edge 1238. The width of the depression may be defined as the arc length of arc W. In some embodiments, the width may be at least 5, 8, 10, 12, 15, 20, 30, or 45 degrees. In some embodiments, the width may be at most 20, 30, 45, 70, 90, 120, or 150 degrees.

The upper surface 1228 of the substrate 1220 may or may not also include a compressive stress hoop 1252. The compressive stress hoop 1252 may include an annular surface extending around the upper surface 1228 adjacent to the peripheral edge 1238 of the upper surface 1128. For example, while a compressive stress hoop 1252 is present in FIGS. 12A-BThe compressive stress hoop 1152 may extend into the depressions 1236 or may at least extend around at least 90, 105, or 120 degrees of the upper surface 1228.

The compressive stress hoop 1252 may have a constant annular radius or a varied annular radius. If the annular radius is varied, the compressive stress hoop 1252 may be narrowest at a point about 90 degrees from a center point of at least one of the depressions 1236. The annular radius of the compressive stress hoop 1252 may increase towards each of the depression 1236. In some embodiments, an annular radius of the compressive stress hoop 1252 at its narrowest point may be at least 1, 3, 5, 8, 10, or 15 percent of the radius of the substrate 1120. In some embodiments, the annular radius of the compressive stress hoop 1252 at its narrowest point may be at most 10, 15, 20, 25, or 50 percent of the radius of the substrate 1220.

The compressive stress hoop 1252 may include a planar or curved surface. In some embodiments, the compressive stress hoop 1252 may be perpendicular (or otherwise angled) to the z-axis of the cutting element 1200 at a point about 90 degrees from a center point of at least one of the depressions 1236. The surface of the compressive stress hoop 1252 may be curved as it merges into the depressions 1236. The compressive stress hoop 1252 may have a different curvature than the adjacent portions of the upper surface 1228, such that an angled or curved deviation ring 1254 is formed on an inner edge of the compressive stress hoop 1252. One skilled in the art will recognize that a cutting element in accordance with these embodiments may be formed without a compressive stress hoop without departing from the scope of this disclosure. The upper surface 1228 may also include a plurality of protrusions 1225. In the illustrated embodiment, the protrusions 1225 are a plurality of generally tear-drop shaped protrusions 1225 (having one rounded end and one end coming to a point). However, protrusions may be of other shapes, including other elongate (longer than wide) shapes, such as ovals, generally crescent shaped (having a general curvature along the length thereof with rounded ends, fabiforms or reniforms (generally bean-shaped, rounded but having an indentation on one side) but may also be non-elongate shapes such as circles, etc. As shown, the points of generally tear-drop shaped protrusions 1225 are pointed inward towards the x-axis from both sides of the x-axis. A plurality of protrusions 1225 are on either side of crest 1224 on the substrate upper surface 1228 extending towards depressed regions 1126. With such orientation, the length of the plurality of protrusions are generally aligned with (substantially parallel or within 20 degrees of) the length of crest 1224. In one or more embodiments, the protrusions 1225 extend a height ranging from about 0.010 to 0.050 inches (0.25 to 1.3 mm). In some embodiments, the protrusions 1225 extend a height that is equal to or greater than about 5%, about 10%, about 15%, or about 20%, and less than or equal to about 50%, about 45%, about 40%, or about 35% the smallest thickness of the ultrahard layer 1210. One skilled in the art may readily envision that an upper surface 1228 of a substrate 1220 may include protrusions differing in shape, dimension, or number from those explicitly described, or may not include protrusions at all without departing from the scope of this disclosure.

One skilled in the art will recognize that a substrate 1220 described with respect to FIGS. 12a-12d may be used in combination with an ultrahard layer having any shape known in the art without departing from the scope of this disclosure. Such an ultrahard layer may or may not include a cutting crest. Further, one skilled in the art will readily envision that if such a substrate 1220 is used with an ultrahard layer including more than one cutting crest, the substrate may be modified to include additional crests and/or depressions.

Figure 13A:
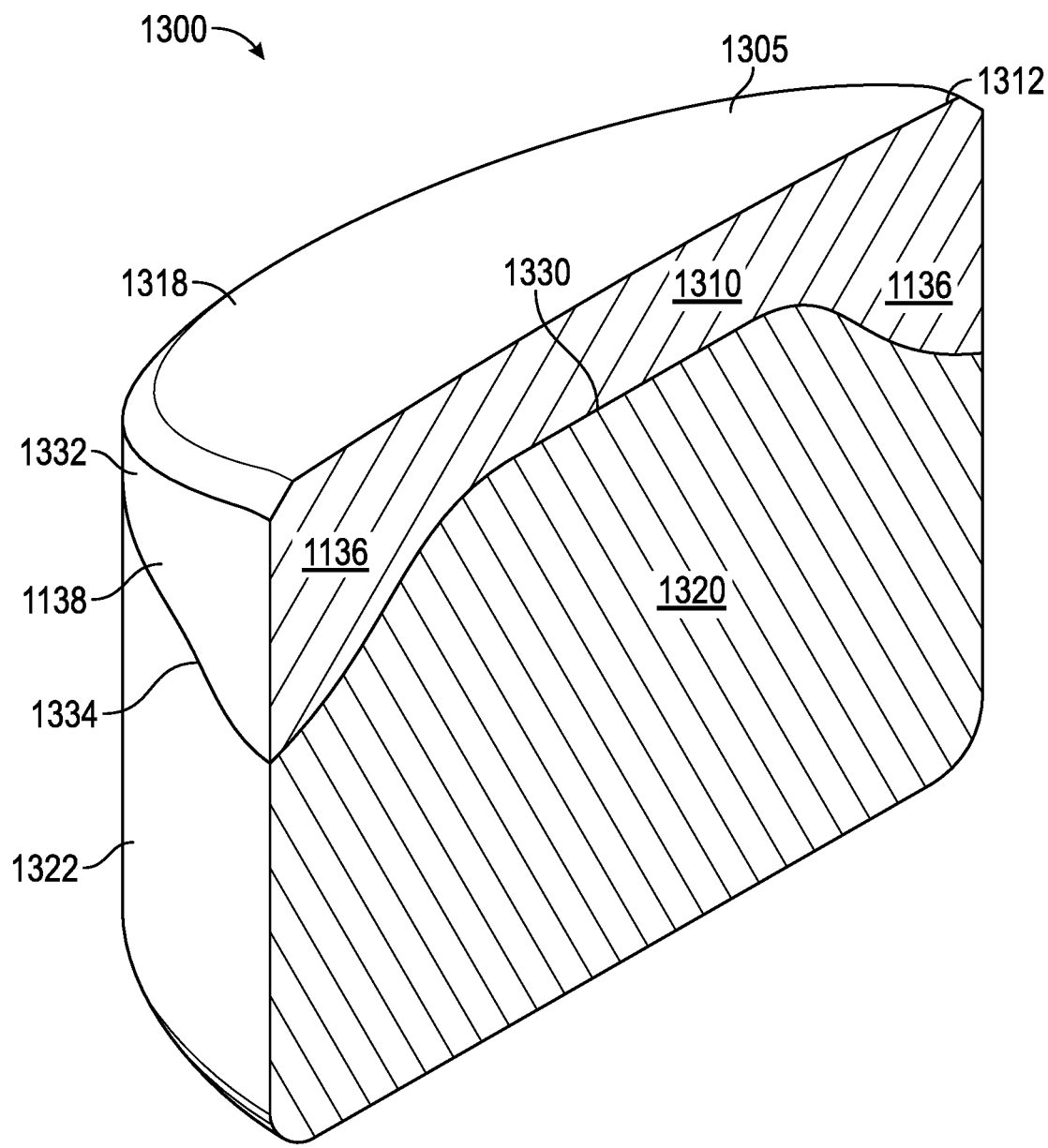
FIGS. 13A-13C show a cutting element in accordance with the present disclosure.
Figure 13B:
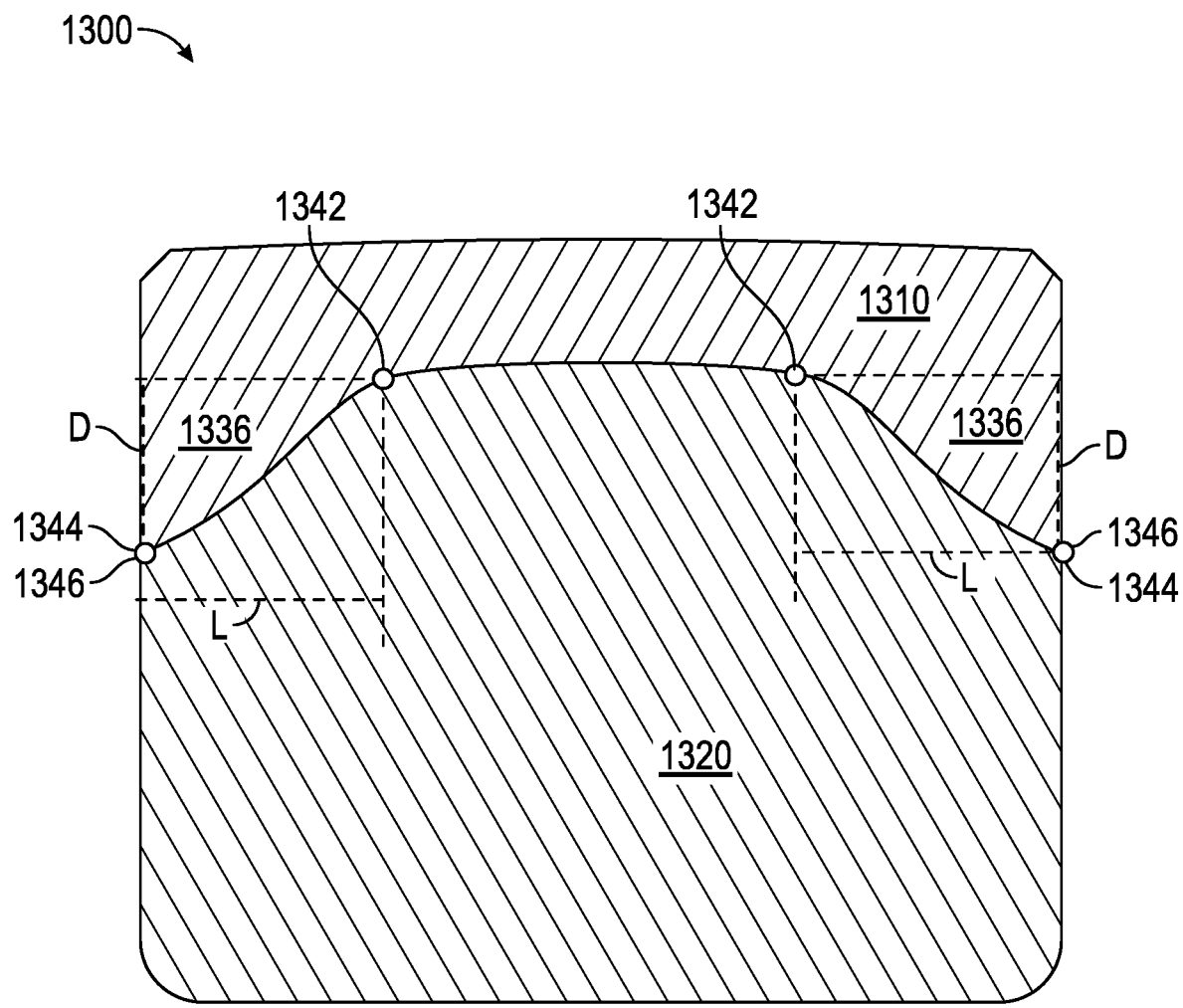
Figure 13C:
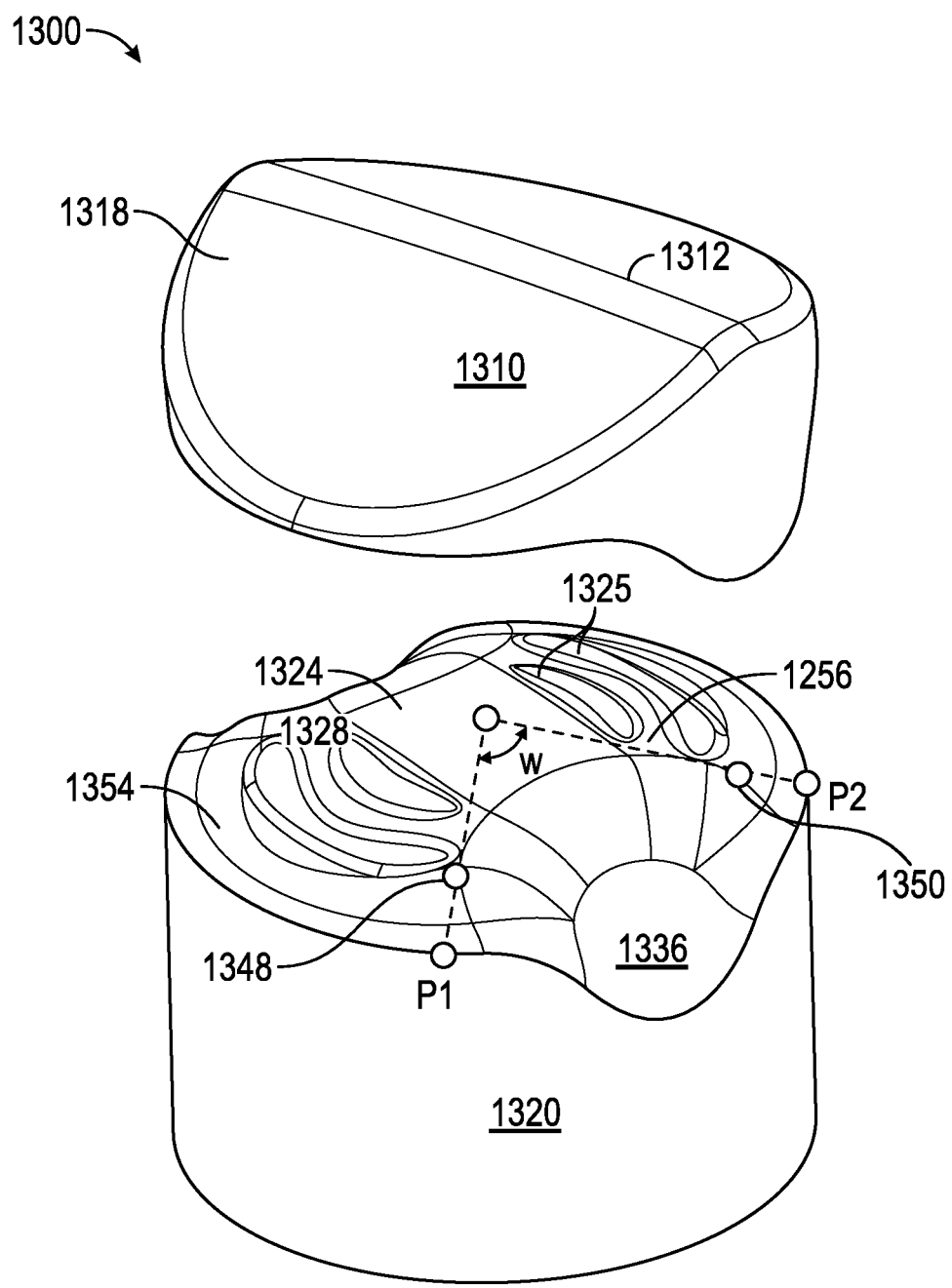

FIGS. 13A-13C illustrate a cutting element 1300, which may include an ultrahard layer 1310 disposed on a substrate 1320 at an interface 1330. FIGS. 13A and 13B show a cross-sectional view along the y-axis of the cutting element. The ultrahard layer 1310, may form a non-planar top surface 1305 that includes a cutting crest 1312 extending lengthwise along the y-axis (the cross-sectional view bisects the cutting crest 1112). The top surface 1305 may have the general shape of a parabolic cylinder. Extending laterally (along the x-axis) away from the cutting crest 1312, the ultrahard layer 1310 may include at least one recessed region 1318 formed by the continuous decreases in height of top surface 1305 in a direction away from the cutting crest 1312.

As can be most clearly seen in FIGS. 13C, showing an exploded view of ultrahard layer 1310 detached from substrate 1320, an upper surface 1328 of the substrate 1320 may be non-planar. In some embodiments, the substrate 1320 may include a crest 1324 that extends in substantial alignment with cutting crest 1312 (along the y-axis). However, while cutting crest 1312 may extend along substantially along the entire diameter of cutting element 1300, in accordance with embodiments of the present disclosure, crest 1324 of substrate 1320 extends less than the entire diameter given the inclusion of depressions 1336 (discussed below) that that are in line with crest 1324 (and between crest 1324 and a peripheral edge 1338). Thus, the crest 1324 has a peak elevation that extends radially outward from a central axis of the cutting element 1300 in a direction that aligns with cutting crest 1312. From a top view of the substrate 1320, the crest 1324 extends linearly (or substantially linearly) until intersecting the depression 1336. A top view of various embodiments is shown in FIGS. 15A-D. The crest 1324 may or may not have a uniform height. If the crest 1324 does not have a uniform height, the crest 1324 may have a uniform convex curvature, such that its ends (adjacent depression 1336) are lower than its peak height (proximate central or z-axis).

The upper surface 1328 may possess convex curvature extending in two directions, specifically, along both the x- and y-axis. The radius of curvature of the upper surface 1328 taken along the x-z cross-section may be smaller than the radius of curvature taken along the y-z cross-section. In other words, the radius of curvature along the crest 1324 may be larger than the radius of curvature formed by the upper surface 1228 extending laterally away from the crest 1324. The curvature along crest 1324 may allow for a thicker ultrahard layer 1310 approaching the cutting edge portion 1334 of the peripheral edge 1332 of the ultrahard layer 1310 and may provide a smoother transition into depression 1336. Further, it is understood that there may be a single curvature along each cross-section, or the curvature may be complex. It is also understood that the curvature may vary across different cross-sections parallel to each of the x-z and y-z cross-sections.

The upper surface 1328 may also include one or more depressions 1336. The depressions 1336 may be formed along the x-axis, in line with the crest 1324. In some embodiments, the depressions 1336 may be proximate a peripheral edge 1338 of the substrate 1320. As illustrated, the depressions 1336 intersect the peripheral edge 1338. Because a depression 1336 intersects the peripheral edge 1338, the peripheral edge 1338 has a complex (or undulating) curvature adjacent depression 1336. When depression 1336 intersects peripheral edge 1338, the thickness of ultrahard layer 1310 at the cutting edge (where the cutting crest reaches the peripheral edge of the top surface), which is over depression 1336, is increased. In particular, depression 1336 has a depth, and ultrahard layer 1310 has a thickness, such that the peripheral edge 1338 of the non-planar upper surface 1328 of the substrate 1320 is at a minimum height at depression 1336. As can be best seen in FIGS. 13C, the depressions 1336 may include one or more curvatures different than the curvature of the crest 1324 along the y-axis, such that the geometry of the upper surface 1128 may have a complex curvature in the y-z cross-sectional plane (which bisects crest 1124 along its length). Examples of curvature of an upper surface of a cutting element along the y-axis are shown in FIGS. 14A-14C and described in more detail below:

In one or more embodiments, the complex curvature may include at least 2 distinct radii of curvature between a central axis and the peripheral edge 1138 (or at least 3 or 4 distinct radii in more particular embodiments). For example, the depressions 1336 may include a region which slopes downward more sharply along the y-axis than the crest 1324. In some embodiments, this downward slope may be linear or nearly linear. The depressions 1336 may also include one or more curvatures in the x-direction. The depressions 1336 may include different curvatures in the x-direction at different distances along the y-axis. The depressions 1336 may include convex, concave, and linear curvatures.

In some embodiments, the depressions 1336 may include a rim 1356. The rim 1356 may be a curve(s), line segment(s), or combination of curve(s) and line segment(s) at which the curvature of the upper surface 1328 in the region of the crest 1324 and the recessed regions 1318 changes to a curvature of the depression 1336. The rate of change of the slope of a line tangent to the upper surface 1328 may change at the rim 1356. The tangent point 1342 may lie along the rim 1356. Examples of rims of depressions are illustrated in FIGS. 15A-15C and described in more detail below.

The depressions 1336 may have a length L, a width measured by an arc W, and a depth D. The length L and the depth D are illustrated in FIG. 13B. The arc W is illustrated on FIG. 13C.

The length L of a depression 1336 may be measured along the y-axis, from a tangent point 1342 of the depression 1336 to an outermost point 1344 of the depression 1336. The tangent point 1342 may be a point along the y-axis at which the curvature of the upper surface 1328 changes from the curvature of the crest 1224 to a different curvature. In other words, the rate of change of a tangent line of the upper surface 1128 along the y-axis may change at the tangent point. The outermost point 1344 is a point along the y-axis furthest from the center of the upper surface 1228, which has the lowest height. In some embodiments, it is understood that the outermost point 1344 may lie on the peripheral edge 1238 of the substrate 1320, where depression 1336 intersects peripheral edge 1338. In some embodiments, the length L may be at least 5, 10, 15, 25, 30, or 50 percent of the radius of the substrate 1320. In some embodiments, the length L may be at most 25, 40, 50, 60, or 75 percent of the radius of the substrate 1320.

The depth D of a depression 1336 may be measured parallel to the z-axis, from the tangent point 1342 to a lowest point 1346 of the depression 1336. The lowest point 1346 may be a point within the depression 1336, whose depth is greater than or equal to the depth of all other points within the depression 1336. In some embodiments, the depression may include more than one lowest point 1346. For example, an entire region within the depression 1336 may be at an equal, greatest depth. The lowest point may or may not lie along the y-axis.

As described above, the substrate 1320 and the ultrahard layer 1310 may abut at the interface 1330. The ultrahard layer 1310 may extend into the depressions 1336, such that the ultrahard layer 1310 also has a depth D within the depression 1336. In some embodiments, the depth D of the ultrahard layer 1310 may be at least 15, 25, 50, 75, 100, 110, 120, 130, or 140 percent of the thickness of the ultrahard layer 1310 at the z-axis of the cutting element 1300. In some embodiments, the depth D of the ultrahard layer 1310 may be at most 50, 75, 85, 90, 120, 125, 140, 150, 175, 190, or 200 percent of the thickness of the ultrahard layer 1310 at the z-axis of the cutting element 1300.

The width of a depression 1336 may be measured as an arc length between a first lateral deviation point 1348 and a second lateral deviation point 1350. As discussed above, the upper surface 1328 of the substrate 1320 may include a simple curvature along both the x-axis and along the y-axis. The portion of the upper surface 1328 lateral to the crest 1324 may have a curvature defined by those two simple curvatures. As further discussed above, the depressions 1336 may include a complex curvature which is different than the curvature of the rest of the upper surface 1328. The lateral deviation points 1348, 1350 may be defined as the points farthest from the y-axis on either side of a depression 1336 at which the curvature changes from the simple curvature of the upper surface 1328 to a different curvature. An arc W may be defined along the peripheral edge 1338 of the substrate 1320, from a first point P1, defined as the point at which a line intersecting the z-axis and the first lateral deviation point 1348 intersects the peripheral edge 1338, to a second point P2, defined as the point at which a line intersecting the z-axis and the second deviation inflection point 1350 intersects the peripheral edge 1338. The width of the depression may be defined as the arc length of arc W. In some embodiments, the width may be at least 5, 8, 10, 12, 15, 20, 30, or 45 degrees. In some embodiments, the width may be at most 20, 30, 45, 70, 90, 120, or 150 degrees.

The upper surface 1328 of the substrate 1320 may also include a compressive stress hoop 1352. The compressive stress hoop 1352 may include an annular surface extending around the upper surface 1328 adjacent to the peripheral edge 1338 of the upper surface 1328. The compressive stress hoop 1352 may extend into the depressions 1336 or may at least extend around at least 90, 105, 120, 140 degrees of the upper surface 1128.

The compressive stress hoop 1352 may have a constant annular radius or a varied annular radius. If the annular radius is varied, the compressive stress hoop 1352 may be narrowest at a point about 90 degrees from a center point of at least one of the depressions 1336. The annular radius of the compressive stress hoop 1352 may increase towards each of the depression 1336. In some embodiments, an annular radius of the compressive stress hoop 1352 at its narrowest point may be at least 1, 2, 3, 5, 8, 10, or 15 percent of the radius of the substrate 1320. In some embodiments, the annular radius of the compressive stress hoop 1352 at its narrowest point may be at most 10, 15, 20, 25, or 50 percent of the radius of the substrate 1320.

The compressive stress hoop 1352 may include a planar or curved surface. In some embodiments, the compressive stress hoop 1352 may be perpendicular or otherwise angled) to the z-axis of the cutting element 1300 at a point about 90 degrees from a center point of at least one of the depressions 1336. The surface of the compressive stress hoop 1352 may be curved as it merges into the depressions 1336. The compressive stress hoop 1352 may have a different curvature than the adjacent portions of the upper surface 1328, such that an angled or curved deviation ring 1354 is formed on an inner edge of the compressive stress hoop 1352. One skilled in the art will recognize that a cutting element in accordance with these embodiments may be formed without a compressive stress hoop without departing from the scope of this disclosure. The upper surface 1328 may also include a plurality of protrusions 1325. In the illustrated embodiment, the protrusions 1325 are a plurality of generally crescent shaped protrusions 5125 (having a general curvature along the length thereof with rounded ends (rather than a conventional crescent which comes to a point at its ends)). However, protrusions may be of other shapes, including generally tear-drop shaped (having one rounded end and one end coming to a point), or other elongate (longer than wide) shapes, such as ovals, fabiforms or reniforms (generally bean-shaped, rounded but having an indentation on one side), but may also be non-elongate shapes such as circles, etc. As shown, the curvature of the crescent-shaped protrusions 1325 are bowed outwards from towards the y-axis away from crest 1324. A plurality of protrusions 1325 are on either side of crest 1324 on the substrate upper surface 1328 extending towards recessed regions 1318. With such orientation, the length of the plurality of protrusions are generally aligned with (substantially parallel or within 20 degrees of) the length of crest 1324. In one or more embodiments, the protrusions 1325 extend a height ranging from about 0.010 to 0.050 inches (0.25 to 1.3 mm). In some embodiments, the protrusions 1325 extend a height that is equal to or greater than about 5%, about 10%, about 15%, or about 20%, and less than or equal to about 50%, about 45%, about 40%, or about 35% the smallest thickness of the ultrahard layer 1310. One skilled in the art may readily envision that an upper surface 1328 of a substrate 1320 may include protrusions differing in shape, dimension, or number from those explicitly described, or may not include protrusions at all without departing from the scope of this disclosure.

One skilled in the art will recognize that a substrate 1320 described with respect to FIGS. 13A-13C may be used in combination with an ultrahard layer having any shape known in the art without departing from the scope of this disclosure. Such an ultrahard layer may or may not include a cutting crest or may include more than one cutting crest, as described for example in U.S. Patent Application No. US20150259988, which is assigned to the present assignee and herein incorporated in its entirety. Further, one skilled in the art will readily envision that if such a substrate 1320 is used with an ultrahard layer including more than one cutting crest, the substrate may be modified to include additional crests and/or depressions.

One skilled in the art will recognize that a cutting element in accordance with the embodiments shown in FIGS. 11-13 may include multiple depressions which may or may not be identical to each other. In some embodiments, depressions formed on a single substrate may be symmetric. In some embodiments, depressions formed on a single substrate may have different dimensions or shapes.

FIGS. 14A-14C illustrate cross-sections of a top surface 1428 of a substrate 1420 along the y-axis, over a radius of the substrate 1420. The cross-sections may include a crest 1424 having a first curvature, and a depression 1436 having one or more curvatures different than the curvature of the crest. A tangent point 1442 may be located at the transition from the crest 1424 to the depression 1436. The tangent point 1442 may be the point at which the curvature along the y-axis changes from the curvature of the crest 1424 to a curvature of the depression 1436. In other words, the rate of change of the slope of a line tangent to the upper surface 1428 along the y-axis may change at the tangent point 1442.

As can be seen in FIGS. 14A-14C, a depression 1436 in accordance with the present disclosure may have different curvatures. FIG. 14A illustrates a depression 1436 having a curved downward slope moving away from the crest 1424, which transitions into a curved upward slope approaching a peripheral edge 1438. A lowest point 1446 of the depression 1436 may be formed at a distance from the peripheral edge 1438. A cutting element made in accordance with the embodiment shown in FIG. 14A may not be identifiable as a cutting element including a depression 1436 based on external examination.

FIG. 14B illustrates a depression 1436 having curved downward slope moving away from the crest 1424, which transitions into a horizontal line approaching a peripheral edge 1438. This depression 1436 may have multiple lowest points 1446, as every point within the horizontal region may be a lowest point 1446. An overall volume of the depression 1436 illustrated in FIG. 14B may be substantially greater than the volume of the depression 1436 illustrated in FIG. 14C.

FIG. 14C illustrates a depression 1436 having a linear or nearly linear downward slope moving away from the crest 1424, which first transitions into a horizontal line, and then transitions into a dimple 1440 approaching the peripheral edge 1438.

One skilled in the art may readily envision modifications to these cross-sections which fall within the scope of this disclosure. For example, elements of the cross-sections shown in FIGS. 14A-14C may be combined, or the slope of various portions of a cross-section may be modified. The depth, length, and width of the depressions illustrated may also be modified as described above with respect to FIGS. 11-13.

FIGS. 15A-15D illustrate top elevation views of an upper surface 1528 of a substrate 1520. The upper surface may include a crest 1524 and a depression 1536. Looking at the peak elevation for the upper surface 1528, crest 1524 extends substantially linearly and then forks at depression 1436, thereby forming a generally wishbone shape. One skilled in the art will readily envision that the upper surfaces 1528 may include a second depression 1536, or any number of depressions 1536, without departing from the scope of this disclosure.

A rim 1556 may be formed around the depression 1536. The rim 1556 may include a curve, line segment, or combination of curves and line segments along which the curvature of the upper surface 1528 in the region of the crest 1524 and lateral areas transitions to a curvature of the depression 1536. Such curvatures may extend in a direction parallel to the x-axis and a direction to the y-axis.

Figure 15D:
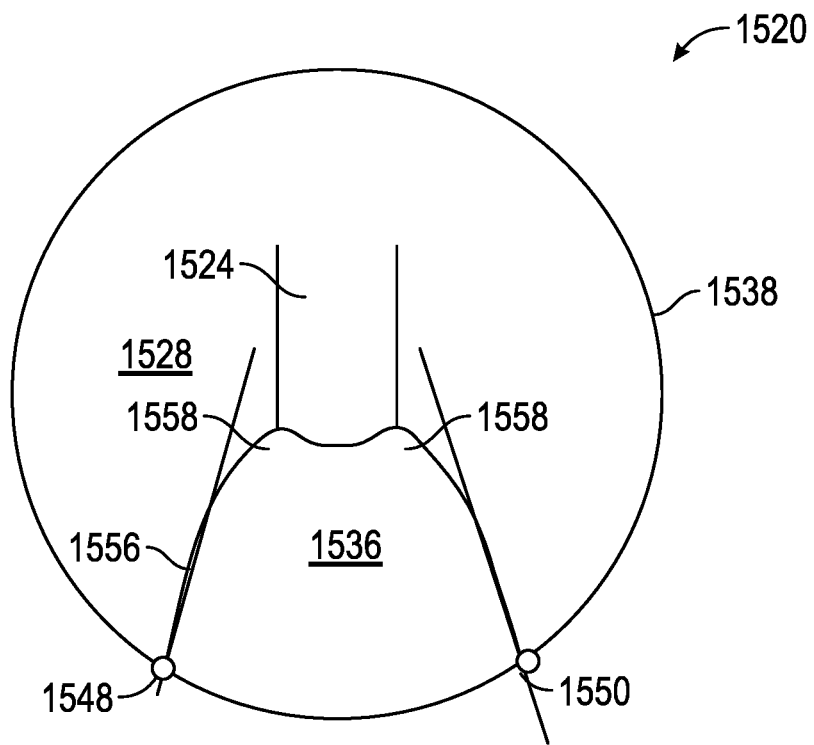

As can be seen in FIGS. 15A-15D, a rim 1556 of a depression 1536 may have different shapes. FIG. 15A illustrates an embodiment in which a generally curved edge of the depression 1536 reaches first lateral deviation point 1548 and a second lateral deviation point 1550 at a distance set back from the peripheral edge 1538, and then narrows, i.e., forming an open generally ellipse shape. FIG. 15B illustrates an embodiment in which a generally curved edge of the depression 1536 grows wider at a nearly linear slope until it reaches the peripheral edge 1538, such that the first lateral deviation point 1548 and the second lateral deviation point 1550 are located along the peripheral edge, i.e., forming a general parabola shape. FIG. 15C illustrates an embodiment in which a generally curved edge of the depression 1536 reaches first lateral deviation point 1548 and a second lateral deviation point 1550 at a distance set back from the peripheral edge 1538, and then narrows. The rim 1556 has a generally closed ellipse shape and includes a single point at the peripheral edge 1538. FIG. 15D illustrates an embodiment in which the rim 1556 includes two "points" proximate the crest 1524, and curves outward away from the points 1558 towards the peripheral edge 1538, such that the first lateral deviation point 1548 and the second lateral deviation point 1550 are located along the peripheral edge.

One skilled in the art may readily envision different shapes that rims 1556 may take based on these illustrations and description. For example, an edge may include straight line segments connected at curved corners, such that a top view of a depression has a generally polygonal shape, for example a triangular, trapezoidal, or rectangular shape. Additionally, rims 1556 have been illustrated herein as being symmetric about a y-axis, but this is not necessary, and cutters in accordance with the present disclosure may have depressions with asymmetric edges. One skilled in the art may also envision combinations including different embodiments shown in FIGS. 15A-15D.

In some embodiments, as illustrated in FIGS. 15A-15B, the crest 1524 may include a single linear region at a highest elevation. Such a crest 1524 may form a peak. In some embodiments, as illustrated in FIGS. 15C-15D, the crest 1524 may include a wider region at a highest elevation. Such a crest 1524 may form a plateau. These illustrations are not meant to be limiting: either a peaked crest or a plateau crest may be used with any shape of depression.

FIGS. 28-30 illustrate FEA analyses of an ultrahard layer disposed above a substrate having different features (between the figures). Scales are provided with the figures to indicate areas of tensile and compressive stress.

Figure 28A:
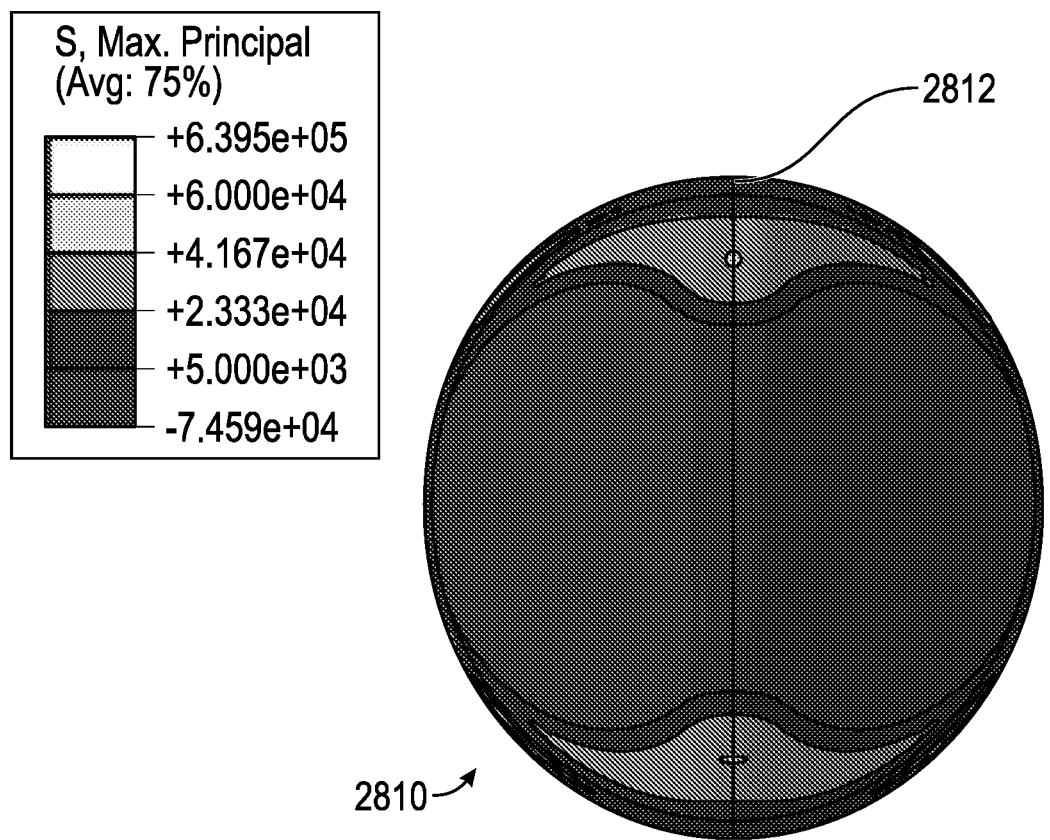
FIGS. 28A-28C shows views of FEA analyses of an ultrahard layer according to embodiments of the present disclosure.
Figure 28B:
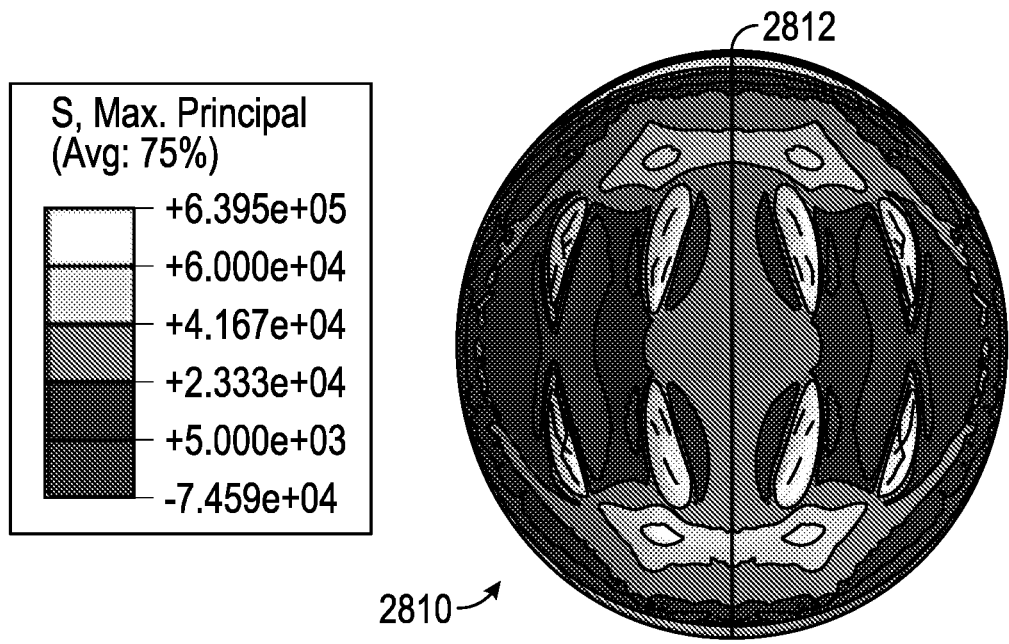
Figure 28C:
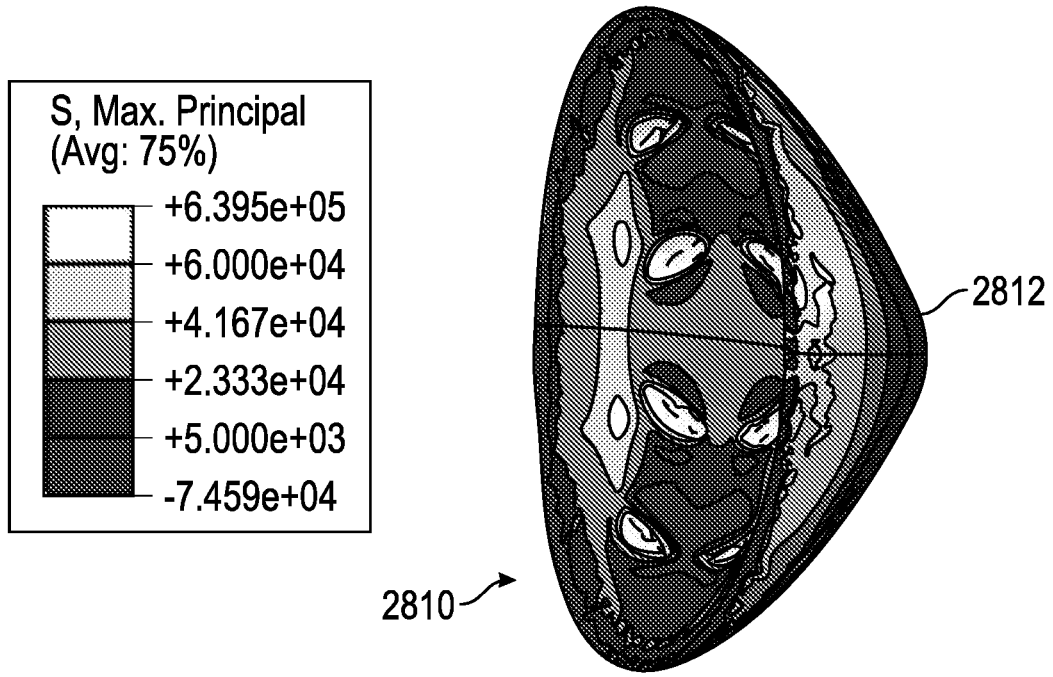

FIGS. 28A-28C illustrate an ultrahard layer 2810, disposed above a substrate, which does not include depressions along its crest. FIG. 28A illustrates a top view of the ultrahard layer. FIG. 28B illustrates a bottom view of the ultrahard layer 2810. FIG. 28C illustrates a plan view of the ultrahard layer 2810. The ultrahard layer 2810 includes a cutting crest 2812. As can be seen in FIG. 28A and FIG. 28C, the top and side surfaces of the ultrahard layer 2810 experience high tensile stress proximate the cutting crest 2812. As discussed above, these are the points of the ultrahard layer 2810 which may make contact with a material being cut. FIGS. 28B-28C show that the bottom surface of the ultrahard layer 2810 experiences some compressive stress along its circumference, but not to the extent as experienced by cutting elements according to the present disclosure, as shown in and discussed below in relation to FIGS. 30A-30C.

Figure 29A:
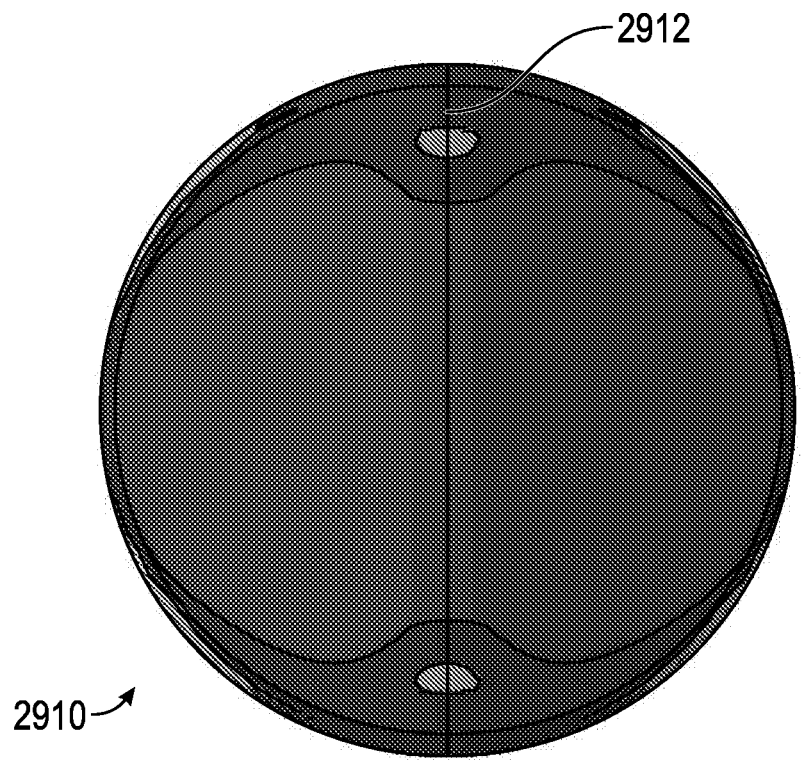
FIGS. 29A-29C shows views of FEA analyses of an ultrahard layer according to embodiments of the present disclosure.
Figure 29B:
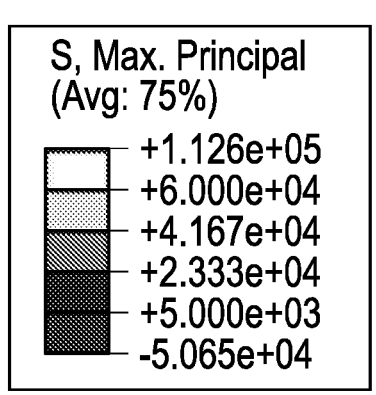
Figure 29B:
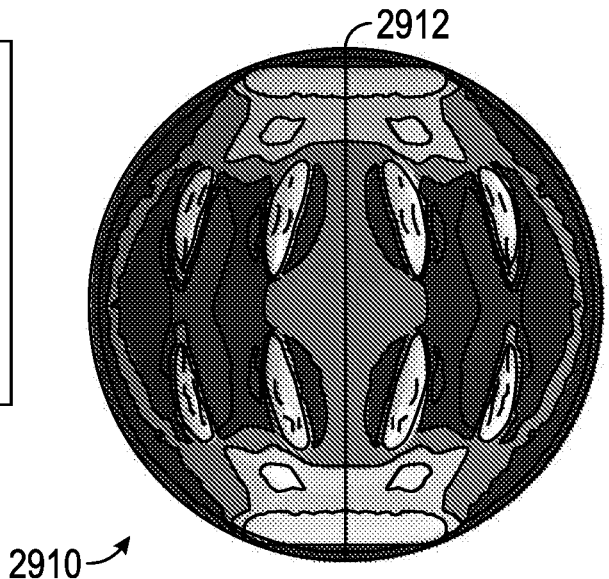
Figure 29C:
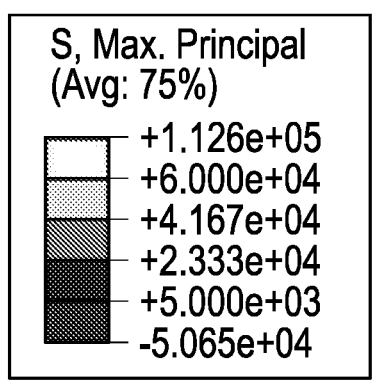
Figure 29C:
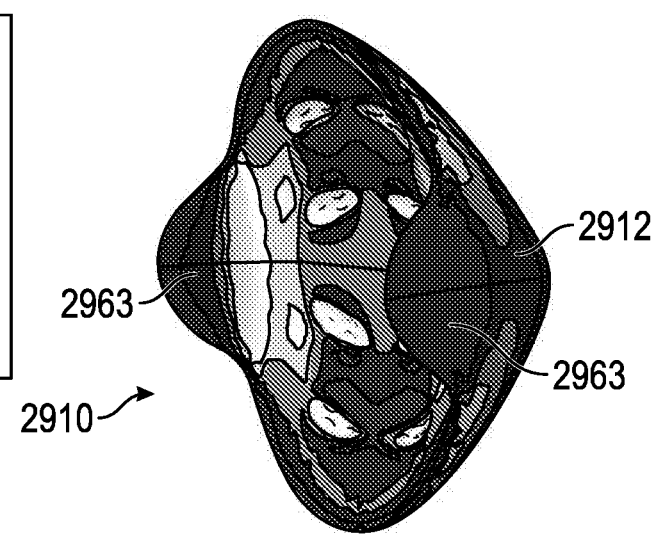

FIGS. 29A-29C illustrate an ultrahard layer 2910, disposed above a substrate, which includes lip-like depressions along its crest (similar to the embodiment illustrated in FIGS. 12C-D). FIG. 29A illustrates a top view of the ultrahard layer 2910. FIG. 29B illustrates a bottom view of the ultrahard layer 2910. FIG. 29C illustrates a plan view of the ultrahard layer 2910. The ultrahard layer 2910 includes a cutting crest 2912.

As can be seen in FIGS. 29A and 29C, the top and side surfaces of the ultrahard layer 2910 experience a smaller region (and less magnitude) of high tensile stress proximate the cutting crest 2912, relative to the ultrahard layer 2810 shown in FIGS. 28A-C. As discussed above, these are the points of the ultrahard layer 2910 that may make contact with a material being cut. Accordingly, this ultrahard layer 2910 may be less likely to experience damage during cutting, particularly at the proximate edge under the crest 2912. FIGS. 29B-29C show that the bottom surface of the ultrahard layer 2910 experiences some tensile stresses, but advantageously in a region that does not make contact with the material being cut. The ultrahard layer 2910 experiences additional regions of compressive stress in the "lips" 2963 which extend into the depressions of the substrate. These regions of low compressive stress may further improve the robustness of the ultrahard layer 2910 and may extend the life of a cutting element made with such an ultrahard layer 2910.

Figure 30A:
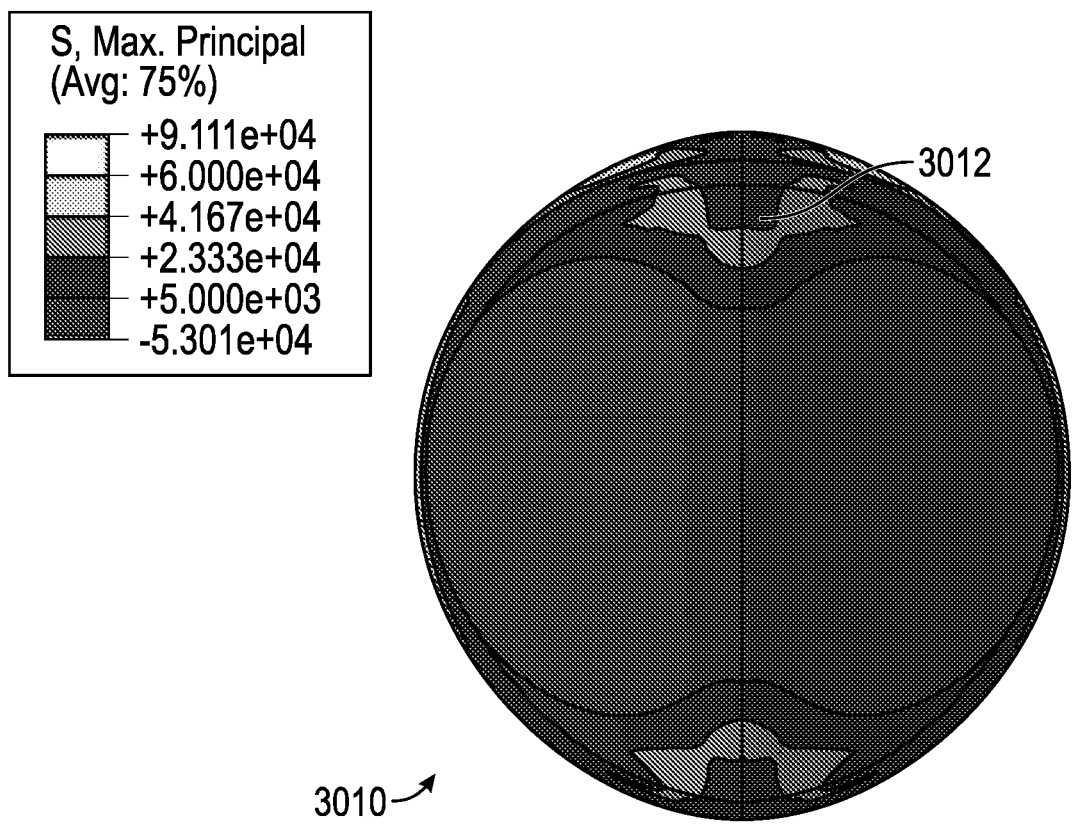
FIGS. 30A-30C shows views of FEA analyses of an ultrahard layer according to embodiments of the present disclosure.
Figure 30B:
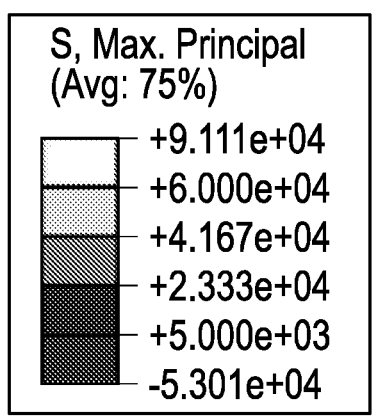
Figure 30B:
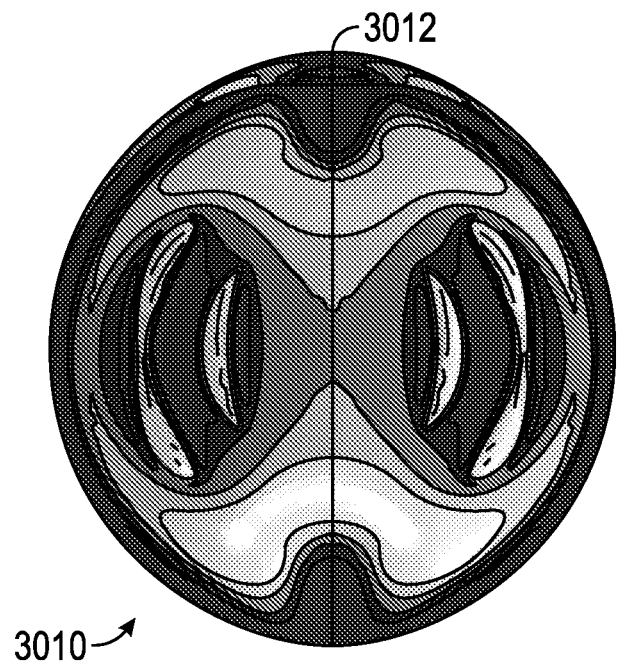
Figure 30C:
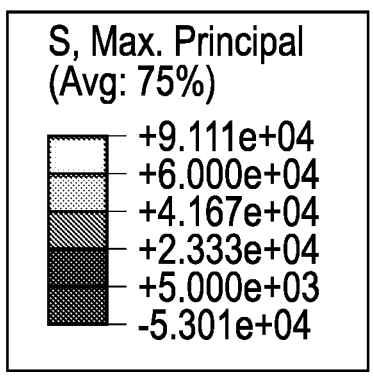
Figure 30C:
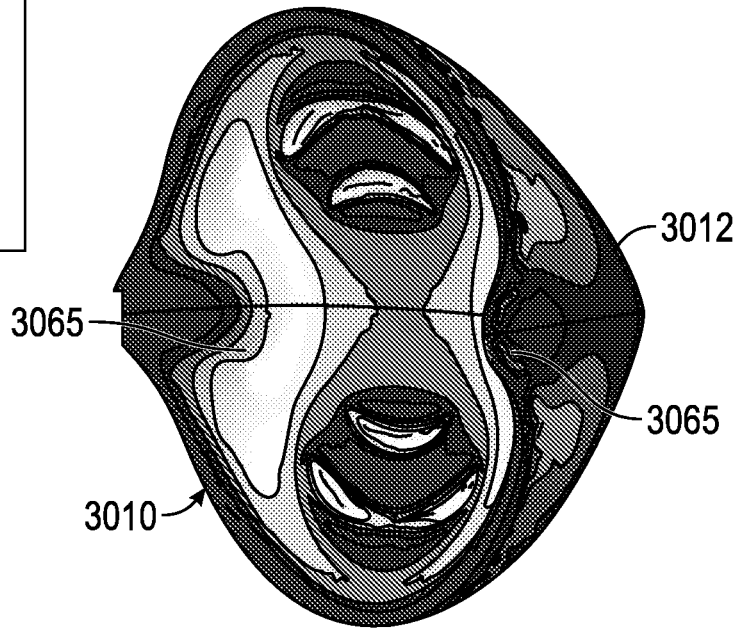

FIGS. 30A-30C illustrate an ultrahard layer, 3010 disposed above a substrate, which includes depressions along its crest. This substrate and ultrahard layer may be similar to those illustrated in FIGS. 13A-13C. FIG. 30A illustrates a top view of the ultrahard layer 3010. FIG. 30B illustrates a bottom view of the ultrahard layer 3010. FIG. 30C illustrates a plan view of the ultrahard layer 3010. The ultrahard layer 3010 includes a cutting crest 3012.

As can be seen in FIGS. 30A and 30C, the top and side surfaces of the ultrahard layer 3010 experience a smaller region (and less magnitude) of high tensile stress proximate the cutting crest 3012, relative to the ultrahard layer 2810 shown in FIGS. 28A-C. As discussed above, these are the points of the ultrahard layer 3010 which may make contact with a material being cut. Accordingly, this ultrahard layer 3010 may be less likely to experience damage during cutting, particularly at the proximate region on the side surface of the ultrahard material under the crest 2912. FIGS. 30B-30C show that the bottom surface of the ultrahard layer 3010 experiences a compressive stress along its circumference. This region may be larger than the analogous region illustrated in FIGS. 28B-28C, which may result, for example, from the compressive stress "hoop" formed in the substrate surface adjacent to the resulting compressive stress in the ultrahard layer. The ultrahard layer 3010 experiences additional regions of compressive stress in the "extensions" 3065 which extend into the depressions of the substrate. These regions may further improve the robustness of the ultrahard layer 3010 and may extend the life of a cutting element made with such an ultrahard layer 3010.

Cutting elements according to embodiments of the present disclosure, especially cutting elements as described with respect to FIGS. 11-15 and 28-30, may have advantages over cutting elements known in the prior art. Cutting elements disclosed herein may be capable of cutting a rock formation at a high depth of cutting (DOC) and rate of penetration (ROP), without the substrate of the cutter engaging the rock formation. In some embodiments, the depressions may be configured such that the ultrahard layer engages the rock formation instead of the substrate engaging the rock formation. Preventing interaction of the substrate and the rock formation may reduce the friction and heat experienced by the substrate. This may further prevent material loss of the substrate due to wearing and erosion. The ultrahard layer, which may contact the rock formation, may have better resistance to heating and thermal fatigue, and may be less likely to experience material loss. Accordingly, the durability of cutters disclosed herein may be increased, e.g., significantly increased, over traditional cutters known in the art.

The depressions and the compressive stress hoop described with respect to FIGS. 11-15 and 28-30 may improve the residual stress state of a cutter. The depressions may provide a high compressive stress zone, which may provide additional strength to the cutting ridge. This may reduce horizontal cracking events in line with the cutting crest, which is one of the top three failure modes in the field. The ultrahard layer extending into the depressions may restrict the substrate from expanding during heating. This may reduce the shear stress causing ring cracking. In addition, high tension along the interface may be constrained by the depressions, thereby reducing the tendency for the substrate or the ultrahard layer to crack at or near the region where cutting is performed. More tension may be taken by the ultrahard layer in the designs disclosed herein, and the ultrahard layer may be less likely to crack than the substrate. The non-planer interface may interrupt crack propagation and reduce the likelihood of the ultrahard layer delaminating during cooling.

Cutting elements according to embodiments of the present disclosure, especially cutting elements as described with respect to FIGS. 11-15 and 28-30, may have additional advantages over cutting elements known in the prior art. Specifically, such cutting elements may demonstrate improved performance in laboratory tests which correlate to improved field performance, for example in drilling applications. Some embodiments of the present disclosure may exhibit improvements in a side impact test, a brazing test, a leaching test, a static loading test, and/or a fatigue test. In a leaching test, cutting elements according to the present disclosure may experience a higher average final/failure side static load at both 15 degrees and 20 degrees of back rake angle. The cutting elements may survive a greater number of impacts under a standard unleached cutter condition impact test. Under static load testing, the cutting elements may have an increased final/failure load and may experience failure only at the cutting tip. Cutting elements according to embodiments of the present disclosure may also pass a standard fatigue test. The cutting elements may pass a braze simulation test such that the substrate of the cutting elements may experience no cracks.

In some embodiments, fracture propagation may be reduced under one or more loading conditions. This may reduce the spalling size and improve damage control. The cutting element may be able to support higher loads and tolerate a larger area of wear (e.g., a larger wear flat). These advantages may in turn reduce the risk of premature failure and extend the life of the cutting element.

Some embodiments may exhibit reduced failure under a shallow ridge loss and/or a deep spall or delamination of PCD failure mode. For example, the cutting elements may exhibit a reduced wear scar area under deep spall or delamination conditions, especially after a high number of passes. The cutting elements may be able to withstand a greater number of passes before the substrate is exposed due to wear experienced by the ultrahard layer.

Substrates according to embodiments of the present disclosure may be formed of cemented carbides, such as tungsten carbide, titanium carbide, chromium carbide, niobium carbide, tantalum carbide, vanadium carbide, or combinations thereof cemented with iron, nickel, cobalt, or alloys thereof. For example, a substrate may be formed of cobalt-cemented tungsten carbide. Ultrahard layers according to embodiments of the present disclosure may be formed of, for example, polycrystalline diamond, such as formed of diamond crystals bonded together by a metal catalyst such as cobalt or other Group VIII metals under sufficiently high pressure and high temperatures (sintering under HPHT conditions), thermally stable polycrystalline diamond (polycrystalline diamond having at least some or substantially all of the catalyst material removed), or cubic boron nitride. Further, it is also within the scope of the present disclosure that the ultrahard layer may be formed from one or more layers, which may have a gradient or stepped transition of diamond content therein. In such embodiments, one or more transition layers (as well as the other layer) may include metal carbide particles therein. Further, when such transition layers are used, the combined transition layers and outer layer may collectively be referred to as the ultrahard layer, as that term has been used in the present application. That is, the interface surface on which the ultrahard layer (or plurality of layers including an ultrahard material) may be formed is that of the cemented carbide substrate.

Cutting elements according to embodiments of the present disclosure may be disposed in one or more rows along a blade of a cutting tool. For example, according to embodiments of the present disclosure, a drill bit may have a bit body, at least one blade extending from the bit body, and a first row of cutting elements disposed along a cutting face of the at least one blade. One or more of the cutting elements in the first row may include a cutting element having a non-planar top surface and a non-planar interface formed between an ultrahard layer and a substrate of the cutting element, such as described above. The bit may also have a second row of cutting elements disposed along a top face of the at least one blade and rearward from the first row. One or more of the cutting elements in the second row may include a cutting element having a non-planar top surface and a non-planar interface formed between an ultrahard layer and a substrate of the cutting element, such as described above. In some embodiments, one or more of the non-planar cutting elements in the first and/or second rows may have different shapes (e.g., cutting elements having one or more of the above described variations) from other of the non-planar cutting elements.

Figure 16:
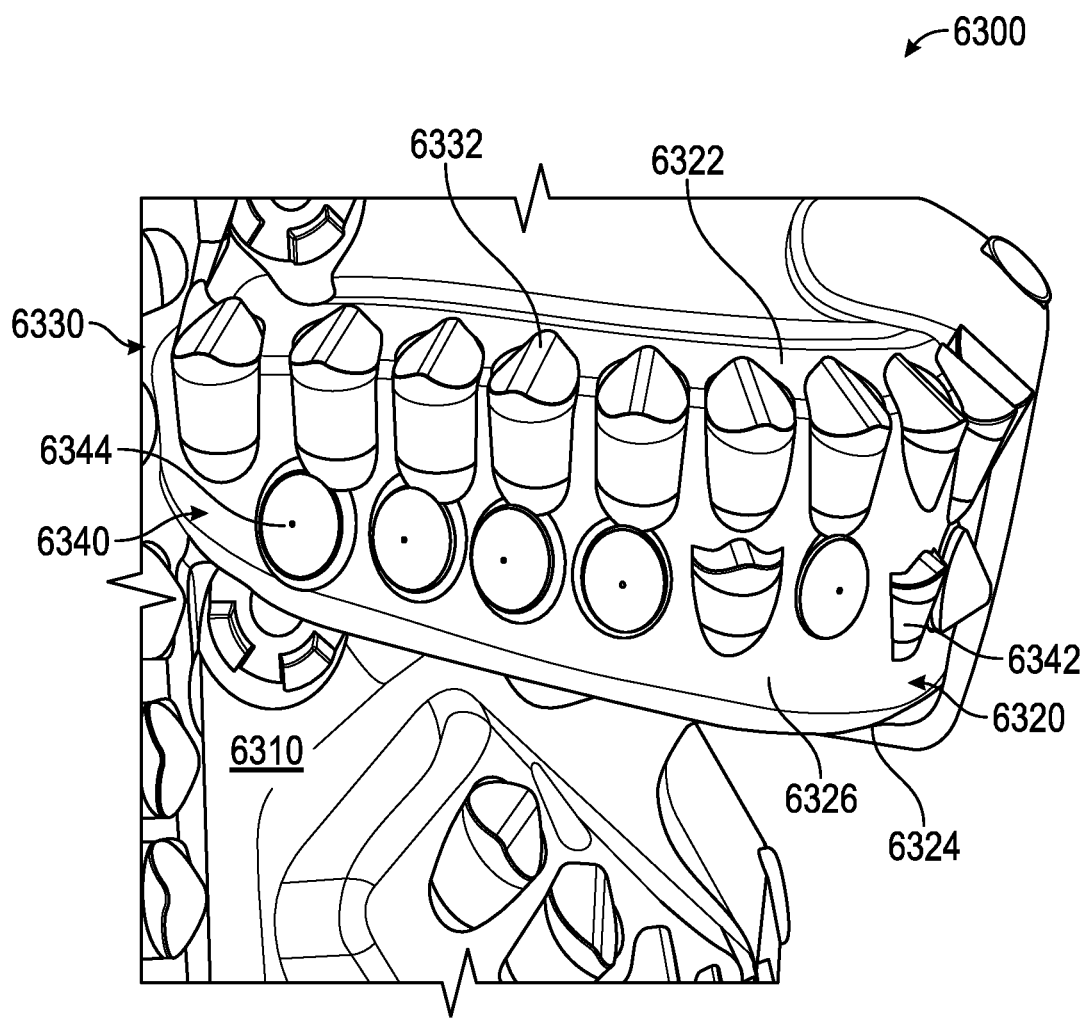
FIG. 16 shows a partial bottom view of a drill bit according to embodiments of the present disclosure.

FIG. 16 shows a partial view of a drill bit according to embodiments of the present disclosure. The drill bit 6300 has a bit body 6310 and at least one blade 6320 extending from the bit body 6310. Each blade 6320 has a cutting face 6322 that faces in the direction of bit rotation, a trailing face 6324 opposite the cutting face 6322, and a top face 6326. A first row 6330 of cutting elements is disposed adjacent the cutting face 6322 of at least one blade 6320. One or more of the cutting elements in the first row 6330 may include a cutting element 6332 (that may be any of the above described cutting elements). For example, the cutting element 6332 may include a substrate having an upper surface with a crest formed therein, the crest transitioning into a depressed region, and an ultrahard layer on the upper surface, thereby forming a non-planar interface between the ultrahard layer and the substrate. In another embodiment, a top surface of the ultrahard layer has at least one cutting crest extending along a diameter from a cutting edge portion of an undulating peripheral edge. In the embodiment shown, the cutting crest along the top surface of the cutting element 6332 forms a substantially parabolic cylinder shape. Further, in one or more embodiments, any of the top surface geometries may be used in combination with any of the substrate/interface surface geometries.

The bit 6300 further includes a second row 6340 of cutting elements disposed along the top face 6326 of the blade 6320, rearward of the first row 6330. In other words, the first row 6330 of cutting elements is disposed along the blade 6320 at the cutting face 6322, while the second row 6340 of cutting elements is disposed along the top face 6326 of the blade 6320 in a position that is distal from the cutting face 6322. One or more of the cutting elements in the second row 6340 may include a cutting element 6342 according to embodiments of the present disclosure. For example, as shown, the cutting element 6342 may have a non-planar top surface and a non-planar interface formed between an ultrahard layer and a substrate of the cutting element, such as described above. A non-planar top surface of a cutting element in either the first row 6330 or the second row 6340 or in both the first row 6330 and the second row 6340 may have a parabolic cylinder or a hyperbolic paraboloid shape. Further, other cutting elements having planar or non-planar top surfaces may be in a first row and/or second row on a blade. For example, as shown in FIG. 16, the second row 6340 of cutting elements may also include cutting elements 6344 having a conical top surface (or other non-conical but substantially pointed cutting surfaces), where the conical top surface may have a rounded apex with a radius of curvature. Cutting elements 6344 having a conical top surface may be positioned on the blade 6320 such that the central or longitudinal axis of the cutting element 6344 is at an angle with the top face 6326 of the blade 6320, where the angle may range from, for example, greater than 0) degrees to 90 degrees. Likewise, other cutting elements having planar or non-planar top surfaces may have a central or longitudinal axis at an angle with the top surface of the blade ranging from greater than 0 degrees to 90 degrees. As shown in FIG. 16, cutting elements 6332, 6342 according to embodiments of the present disclosure may be positioned on the blade 6320 at an angle (formed between a line parallel to the bit axis and a line extending through the radial ends of the cutting crest) ranging from greater than ( ) degrees to 40 degrees (or at least 5, 10, 15, 20, 25, 30, or 35 degrees in various other embodiments).

Figure 20:
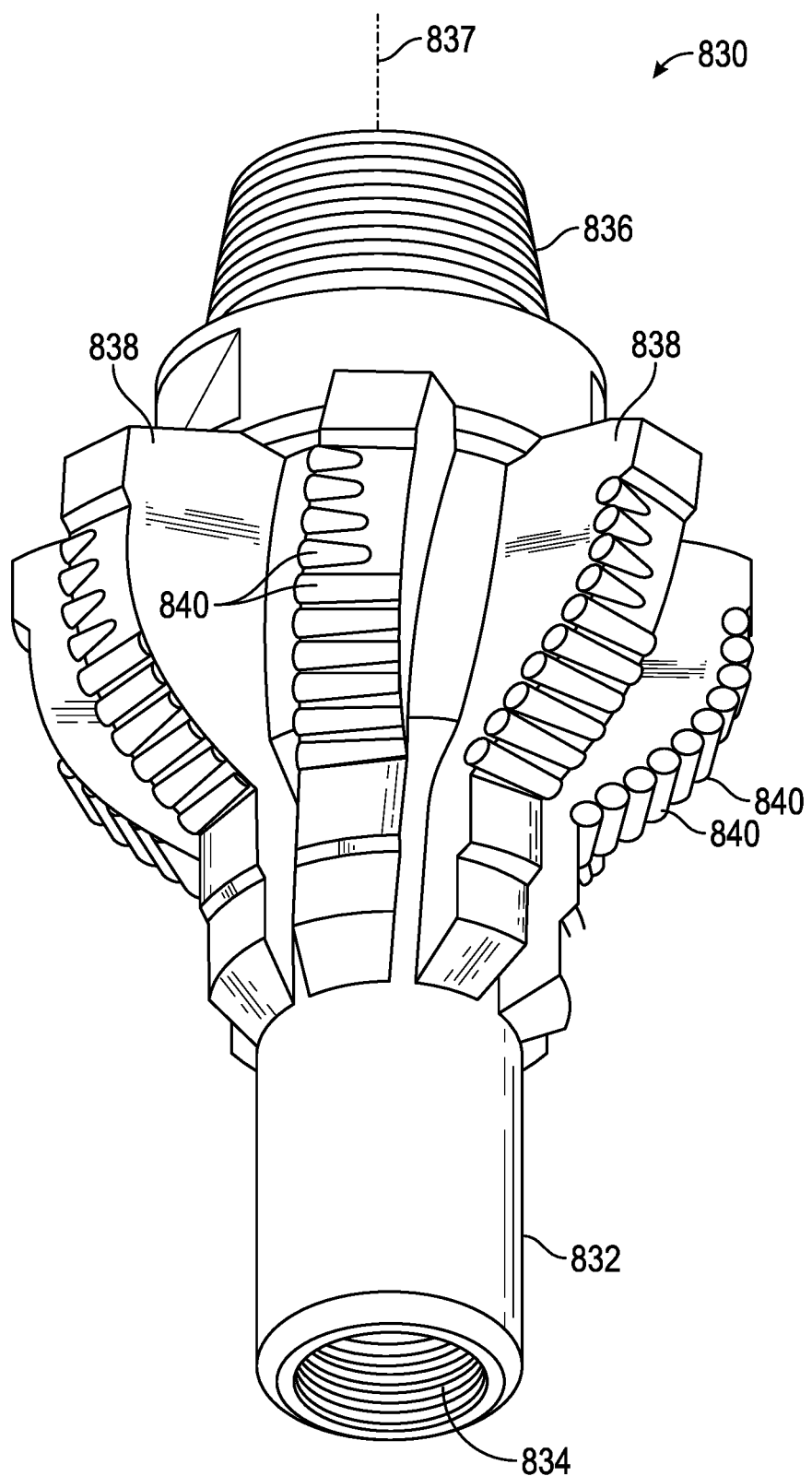
FIG. 20 shows a hole opener according to embodiments of the present disclosure.
Figure 21:
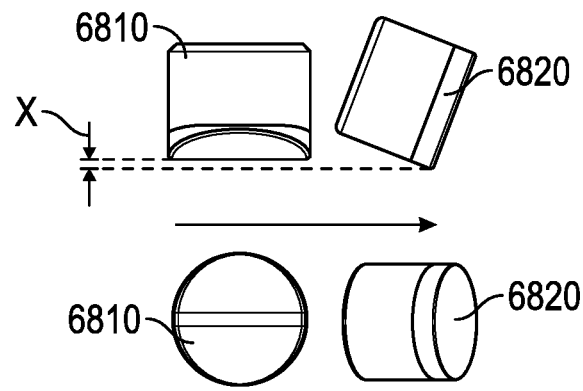
FIGS. 21-23 show side and top views of cutting element orientations according to embodiments of the present disclosure.
Figure 22:
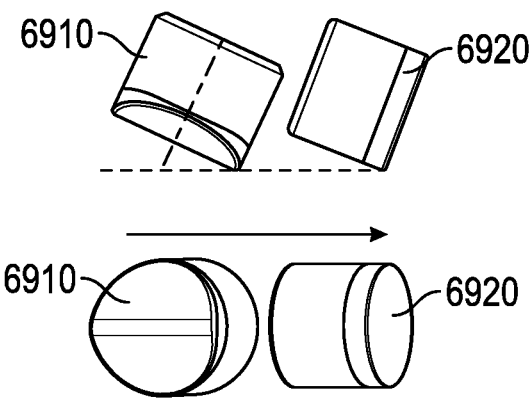
Figure 23:
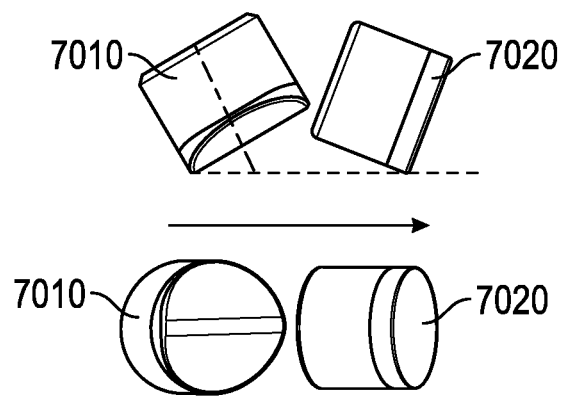
Figure 24:
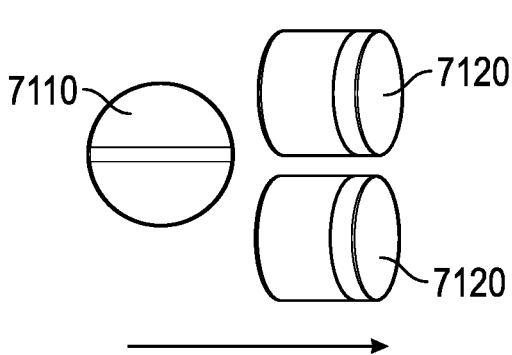
FIGS. 24 and 25 show top views of cutting element combinations according to embodiments of the present disclosure.
Figure 25:
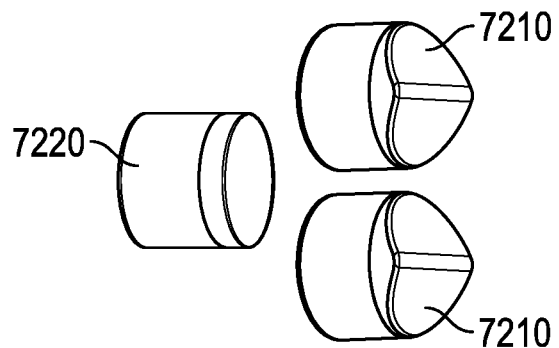

However, as shown in FIG. 21, cutting elements 6832 may be oriented substantially perpendicular to the blade top. That is, the cutting elements 6832 may also be orientated at an angle (formed between a line parallel to the bit axis and a line extending through the radial ends of the cutting crest) ranging from greater than 65 degrees to 115 degrees (or at least 65, 75, 80, 85, 90, 95, 100, 105, 110 degrees in some embodiments). Such angle may also be expressed as the angle formed between a line parallel to the bit axis and a central axis of the cutting element, which would range from 0) to +25 degrees (or at least 0, +5, +10, or +15 degrees). For example, while FIG. 21 shows a cutting element 6810 of the present disclosure tracking a PDC flat cutter 6820, the cutting element 6810 being oriented substantially perpendicular to a blade top surface (with an angle formed between a line parallel to the bit axis and a central axis of the cutting element being 0), FIG. 22 shows a cutting element 6910 tracking a PDC flat cutter 6920 and being oriented with a negative angle (up to −25 degrees), where the cutting edge of the cutting element 6910 is angled in a direction away from direction of rotation, and FIG. 23 shows a cutting element 7010 oriented tracking a PDC flat cutter 7020) and being oriented with a positive angle (up to 25 degrees), where the cutting edge of the cutting element 7010 is angled in a direction towards the direction of rotation. Such orientation may be used on the cutting elements of the present disclosure in any of the illustrated cutting element arrangements (and combinations with PDC flat cutters and conical cutter) provided herein above or below. In particular, however, embodiments may include such cutting elements of the present disclosure as back-up or secondary cutting elements directly behind PDC flat cutters or as primary cutting elements, alone or in combination with PDC flat cutters or other non-planar cutting elements. It is also envisioned that the secondary or backup cutting elements may be at distinct radial positions with respect to the primary cutting elements. For example, referring to FIG. 24, a cutting element 7110 of the present disclosure may be a secondary cutting element at a distinct radial position (relative to a bit centerline) as compared to primary PDC flat cutter 7120 (i.e., cutting element 7110 is behind and between two adjacent PDC flat cutters). Conversely, in FIG. 25, cutting element 7210 of the present disclosure is a primary cutting element, and PDC flat cutter 7220 is a secondary cutting element at a distinct radial position (relative to a bit centerline) as compared to primary cutting elements 7210 of the present disclosure (i.e., a PDC flat cutter is behind and between two adjacent cutting elements 7210). Additionally, when using primary and secondary cutting elements, there may be an exposure difference X, shown for example, in FIG. 21, that may range up to #0.100 inches (2.54 mm). Thus, while there may be no exposure difference (X=0), the cutting element 6810 of the present disclosure may have a greater (0)<X≤0.100 inches) or lesser (−0.100 inches <X< ( ) exposure than the PDC flat cutter 6820. Such exposure difference may be used in any embodiment, including combinations shown in any of FIGS. 16-23 (and also including combinations of the same or similar cutting elements).

Referring back to FIG. 16, in one or more other embodiments, cutting elements 6344 having a conical top surface may be positioned on the blade 6320 at an angle (formed between a line parallel to the bit axis and a central axis of the cutting element) ranging from 0 degrees to 20 degrees, where the tip of the cutting element rotationally leads its substrate, i.e., points in the direction of the leading face.

Further, in the embodiment shown in FIG. 16, cutting elements in the second row 6340 may be positioned rearward of cutting elements in the first row 6330 such that one or more cutting element in the second row 6340 shares a radial position with one or more cutting element in the first row. Cutting elements sharing the same radial position on a blade are positioned at the same radial distance from the central or longitudinal axis of the bit, such that as the bit rotates, the cutting elements cut along the same radial path. A cutting element in the second row 6340 and a cutting element in the first row 6330 sharing a same radial position may be referred to as a backup cutting element and a primary cutting element, respectively. In other words, as used herein, the term "backup cutting element" is used to describe a cutting element that trails any other cutting element on the same blade when the bit is rotated in the cutting direction, and the term "primary cutting element" is used to describe a cutting element provided on the leading edge of a blade. Thus, when a bit is rotated about its central axis in the cutting direction, a "primary cutting element" does not trail any other cutting elements on the same blade. Other cutting elements in the second row 6340 may partially overlap the radial position of cutting elements in the first row 6330 or may be positioned in a radially adjacent position to cutting elements in the first row (i.e., where a cutting element in the second row is positioned rearward of a cutting element in the first row and do not share a radial position along the bit blade). Further, while the illustrated embodiment shows the first row 6330 being filled entirely with cutting elements 6342 having the geometry of the present disclosure, fewer than all of the cutting elements on the first row 6330 may have such geometry and may include substantially pointed cutting elements or planar cutting elements. Such mixing of cutting element types may also be intended for the second row, or the second row may include cutting elements of the same type.

Figure 17:
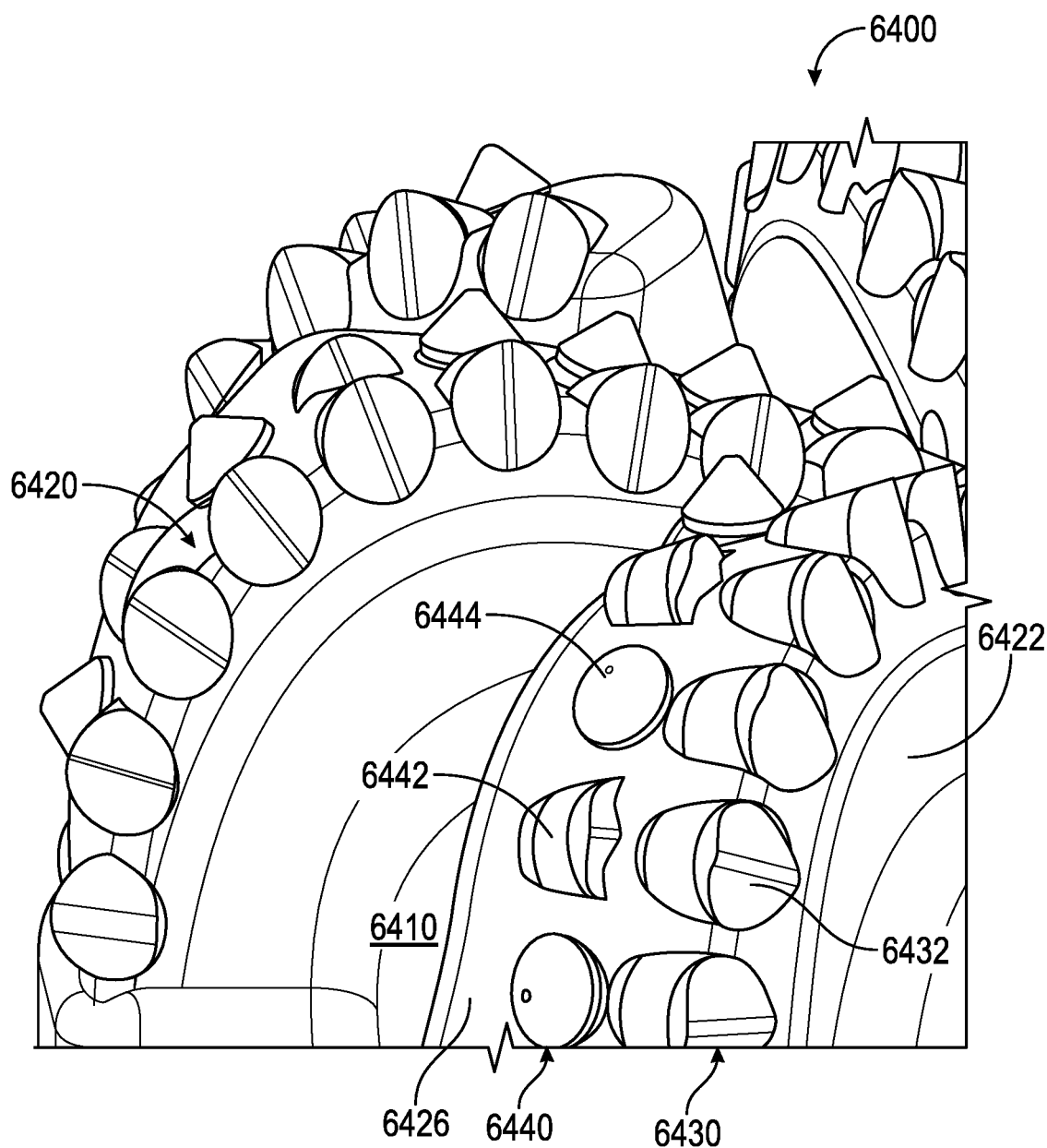
FIG. 17 shows a partial side view of a drill bit according to embodiments of the present disclosure.

FIG. 17 shows a partial view of a drill bit according to embodiments of the present disclosure. The drill bit 6400 has a bit body 6410 and at least one blade 6420 extending from the bit body 6410. Each blade 6420 has a cutting face 6422 that faces in the direction of bit rotation, a trailing face opposite the cutting face 6422, and a top face 6426. A first row 6430 of cutting elements is disposed along the cutting face 6422 of at least one blade 6420. One or more of the cutting elements in the first row 6430 may include a cutting element 6432 having a non-planar top surface and/or a non-planar interface formed between an ultrahard layer and a substrate of the cutting element, according to embodiments of the present disclosure, such as described above. For example, the cutting element 6432 may include a substrate having an upper surface with a crest formed therein, where the crest transitions into a depressed region, and an ultrahard layer on the upper surface, thereby forming a non-planar interface between the ultrahard layer and the substrate. Further, a top surface of the ultrahard layer has a cutting crest extending across a diameter of the cutting element and decreases in height extending laterally away from the cutting crest. In the embodiment shown, the cutting crest along the top surface of the cutting element 6432 forms a parabolic cylinder shape.

The bit 6400 further includes a second row 6440 of cutting elements disposed along the top face 6426 of the blade 6420, rearward of the first row 6430. Cutting elements in the second row: 6440) include at least one cutting element 6442 having a hyperbolic paraboloid shaped top surface according to embodiments of the present disclosure and at least one cutting element 6444 having a conical top surface, where the conical top surface may have a rounded apex with a radius of curvature. Cutting elements 6444 may be positioned in an alternating arrangement with cutting elements 6442 along the second row 6440. In other embodiments, a single type of cutting element (e.g., a cutting element according to embodiments disclosed above, a cutting element having a conical top surface, or a cutting element having a planar top surface) may be positioned adjacent to each other within a row of cutting elements. For example, as shown in FIG. 17, a portion of the second row 6440 includes a plurality of cutting elements 6444 having a conical top surface positioned adjacent to each other, and another portion of the second row 6840 includes cutting elements 6444 having a conical top surface in an alternating arrangement with cutting elements 6442 according to embodiments of the present disclosure. Further, the entire first row 6430 of cutting elements includes a plurality of cutting elements 6432 according to embodiments of the present disclosure.

Figure 26:
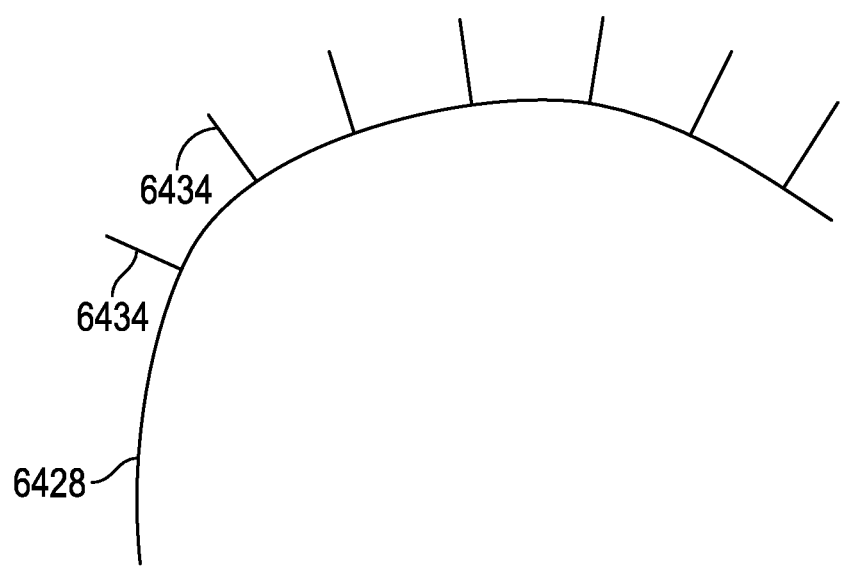
FIG. 26 shows cutting element alignment according to embodiments of the present disclosure.

Further, as shown, one or more of the cutting elements 6432 of the present disclosure may be aligned (with respect to rotation of the cutting element about its central axis) so that the length of cutting crest 6434 of cutting element 6432 may extend substantially perpendicular (within 20, 10, or 5 degrees of perpendicular in various embodiments) away from a profile curve 6428 of the blade 6420) (illustrated in FIG. 26). Such alignment is indicative of the rotation of the cutting elements 6432 and can be implemented for any back rake angle at which the cutting element 6432 is oriented. Such alignment may be achieved through the use of any type of alignment tool, such as a tweezer-like tool that aligns the cutting crest 6434 relative to the blade top face 6422 (e.g., allows a user to manually align the cutting crest or mechanically aligns the cutting crest). Any suitable tool and method may be used to align the cutting crest.

In yet other embodiments, a single type of cutting element may be positioned in a row along a region of the blade. For example, one or more cutting elements having the same shaped top surface may be positioned in a row of cutting elements along a region of a blade. Regions of a blade may generally be divided into a cone region, a shoulder region, and a gage region, where the cone region refers to the radially innermost region of the bit, the gage region refers to the region of the blade along the outer diameter of the bit, and the shoulder region refers to the region of the bit positioned radially between the cone region and the gage region. The shoulder region may also be described as the region of the blade having a convex or upturned curve profile.

Figure 18:
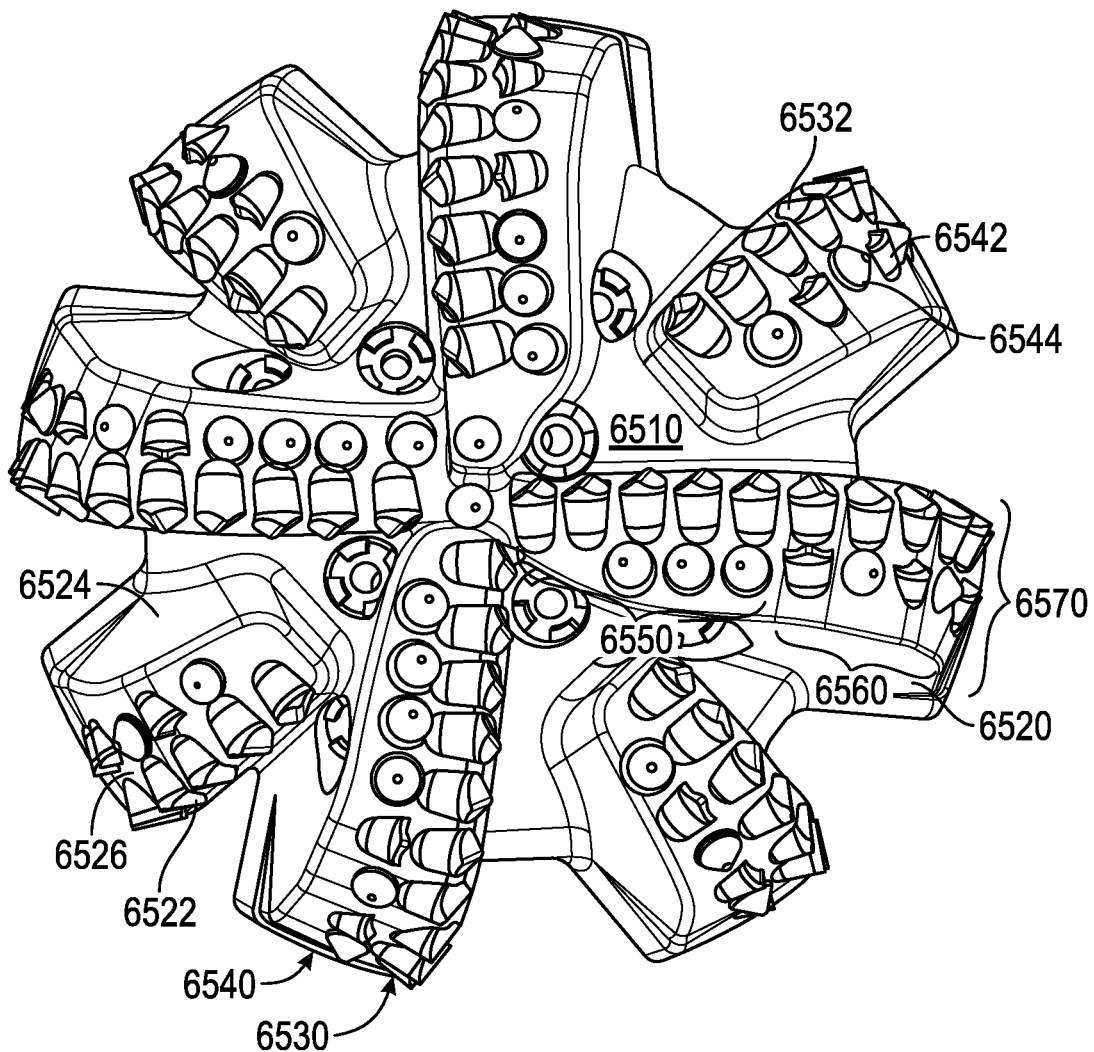
FIG. 18 shows a bottom view of a drill bit according to embodiments of the present disclosure.
Figure 19:
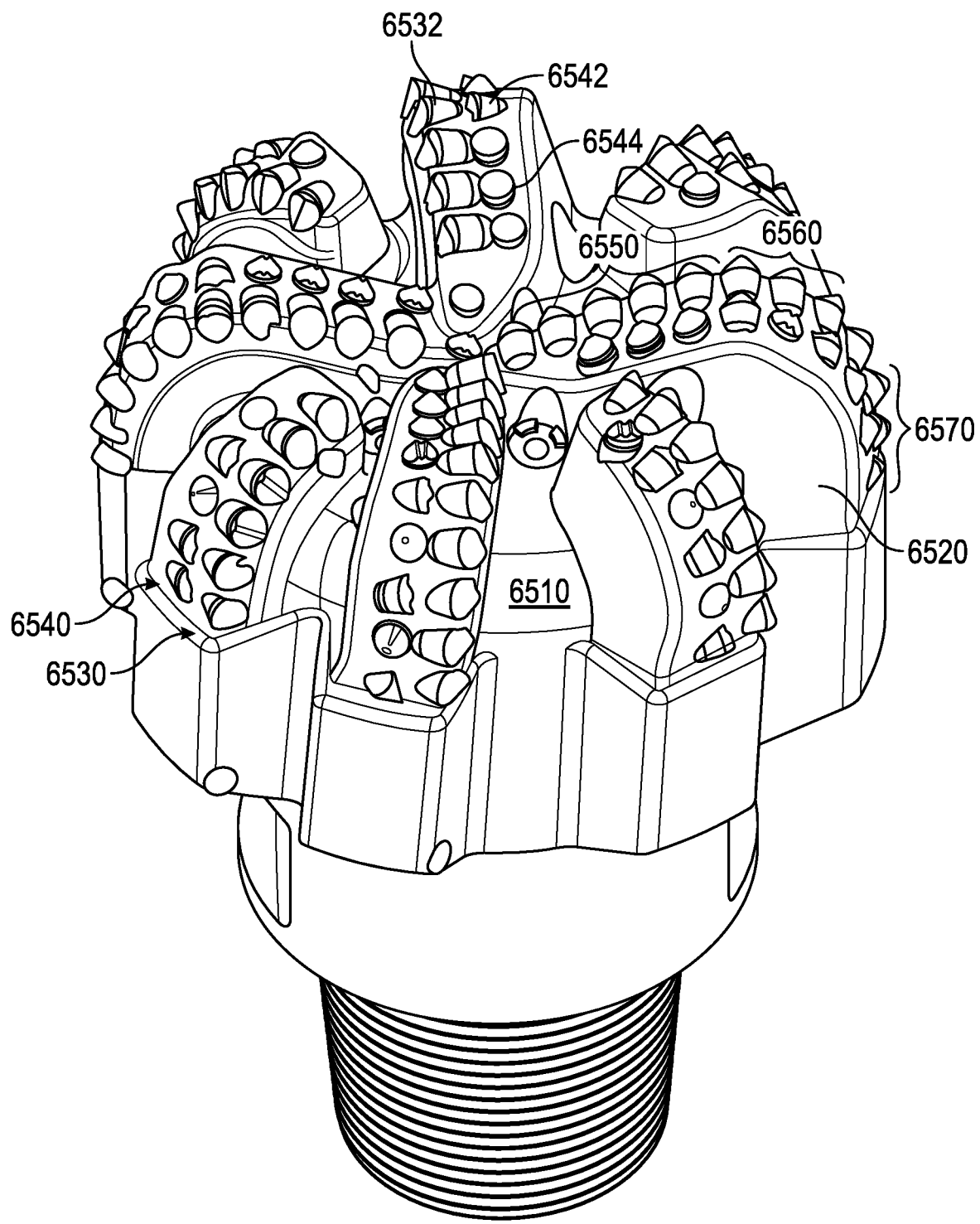
FIG. 19 shows a side view of a drill bit according to embodiments of the present disclosure.

For example, FIGS. 18 and 19 show a bottom view and a perspective view of a drill bit 6500 according to embodiments of the present disclosure having a bit body 6510 and a plurality of blades 6520 extending therefrom. Each blade 6520 has a leading face 6522, a trailing face 6524 opposite the leading face, and a top face 6526. A first row 6530 of cutting elements is disposed along the leading edge (where the leading face transitions to the top face) of at least one blade, where the cutting elements 6532 in the first row have non-planar top surfaces according to embodiments described above. A second row 706540 of cutting elements is disposed along the top face of the blade and rearward of the first row 6530 of cutting elements, where the second row 6540 includes cutting elements 6542 according to embodiments of the present disclosure and cutting elements 6544 having a conical top surface. The second row 6540 of cutting elements along a cone region 6550 of the blade 6520 includes cutting elements 6544 having a conical top surface, and the second row 6540 of cutting elements along a shoulder region 6560 of the blade 6520 includes an alternating arrangement of cutting elements 6544 having a conical top surface and cutting elements 6542 according to embodiments of the present disclosure. Further, the second row 6540) of cutting elements along a gage region 6570) of the blade 6520 includes one or more cutting elements 6544 having a conical top surface. However, in other embodiments, different combinations of types of cutting elements may be positioned in a row along a cone region, a shoulder region and a gage region of a blade. For example, one or more cutting elements having a planar top surface may be positioned in a row of cutting elements along the cone, shoulder and/or gage region of a blade: one or more cutting elements having an parabolic cylinder shaped top surface may be positioned in a row of cutting elements along the cone, shoulder and/or gage region of a blade: one or more cutting elements having a hyperbolic paraboloid shaped top surface may be positioned in a row of cutting elements along the cone, shoulder and/or gage region of a blade; and/or one or more cutting elements having a non-planar top surface may be positioned in a row of cutting elements along the cone, shoulder and/or gage region of a blade.

Figure 27:
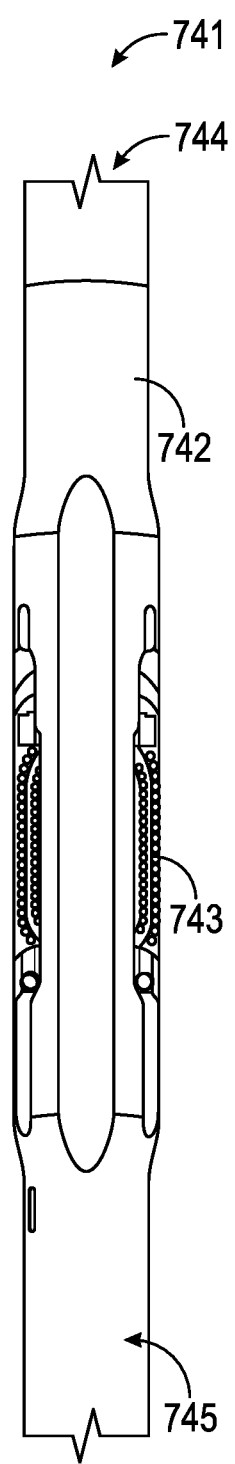
FIG. 27 shows a side view of an expandable reamer according to embodiments of the present disclosure.

Further, while only a drill bit has been illustrated, the cutting elements of the present disclosure may be used on other types of cutting tools such as reamers, mills, etc., as shown in FIG. 20. For example, FIG. 20 shows a general configuration of a hole opener 830 that includes one or more cutting elements of the present disclosure. The hole opener 830 has a tool body 832 and a plurality of blades 838 disposed at selected azimuthal locations about a circumference thereof. The hole opener 830 generally has connections 834, 836 (e.g., threaded connections) so that the hole opener 830 may be coupled to adjacent drilling tools that include, for example, a drillstring and/or bottom hole assembly (BHA). The tool body 832 generally includes a bore therethrough so that drilling fluid may flow through the hole opener 830 as it is pumped from the surface (e.g., from surface mud pumps) to a bottom of the wellbore. Similarly, FIG. 27 shows a general configuration of an expandable reamer 741 that includes one or more cutting elements of the present disclosure. The expandable reamer 741 has a tool body 742 and a plurality of blades 743 disposed at selected azimuthal locations about a circumference thereof. The blades may be movable and may be extended radially outwardly from the body in response to differential fluid pressure between the throughbore and the wellbore annulus. The expandable reamer 741 generally has connections 744, 745 (e.g., threaded connections) so that the expandable reamer 741 may be coupled to adjacent drilling tools. The tool body 742 generally includes a bore therethrough so that drilling fluid may flow through the expandable reamer 741 as it is pumped from the surface (e.g., from surface mud pumps) to a bottom of the wellbore.

Figure 8:
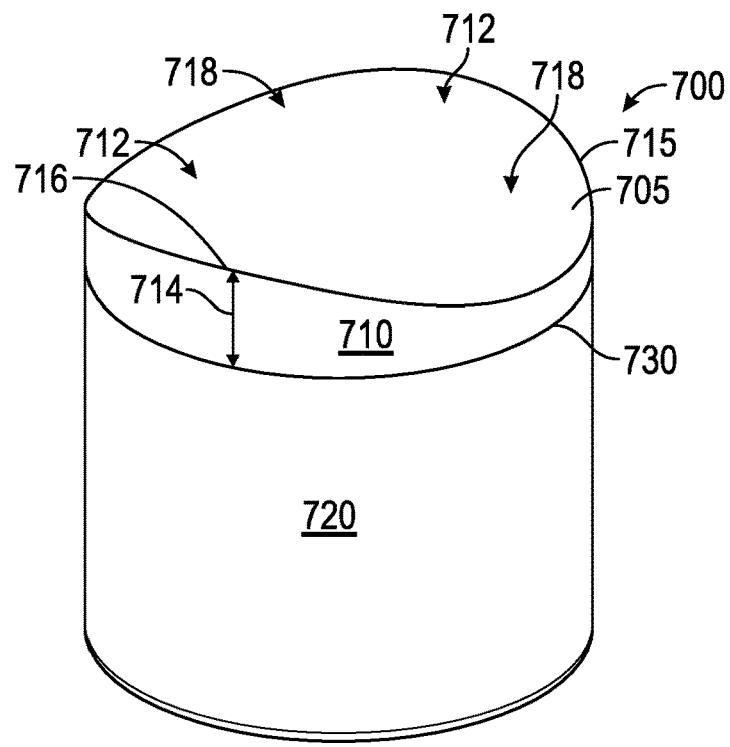
FIGS. 8-10 show a cutting element having a non-planar top surface.
Figure 9:
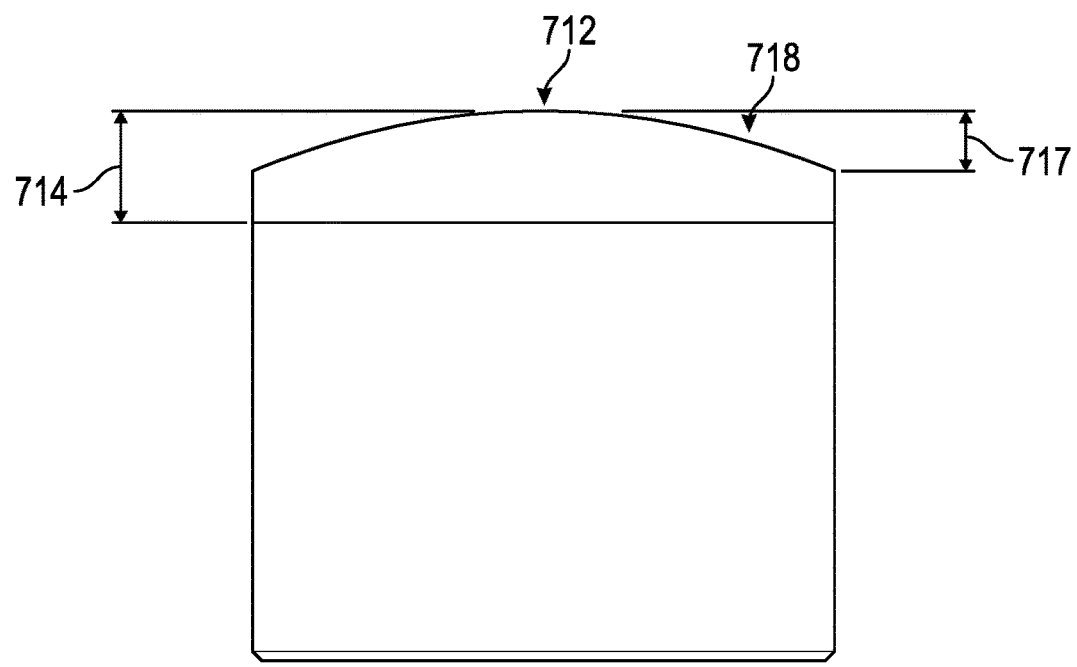
Figure 10:
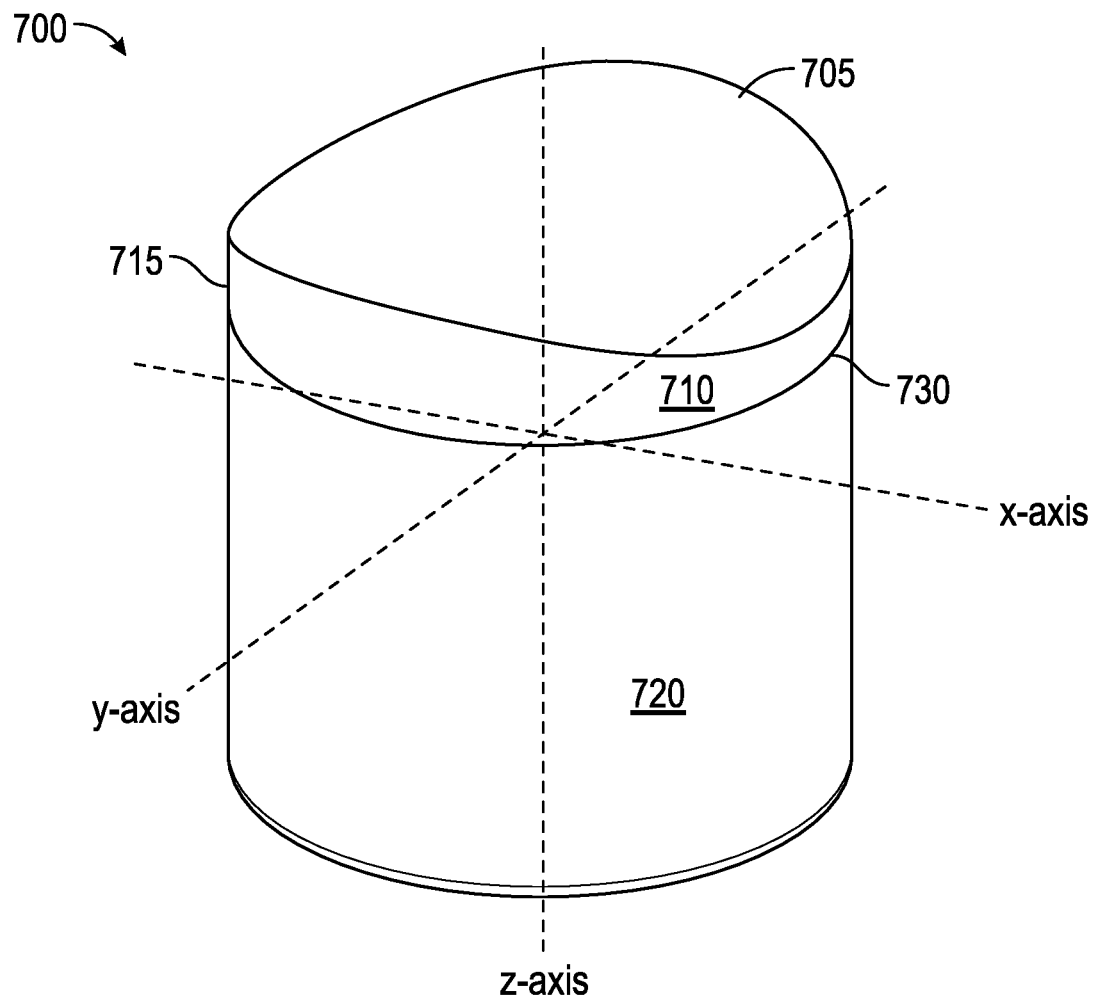

As mentioned above, the present disclosure is not limited to a single working surface shape. FIGS. 8-10 show another example of a cutting element 700 having a non-planar top surface 705. The cutting element 700 has an ultrahard layer 710 disposed on a substrate 720 at an interface 730, where the non-planar top surface 705 is formed on the ultrahard layer 710. The ultrahard layer 710 has a peripheral edge 715 surrounding the top surface 705. The top surface 705 has a non-uniform cutting crest 712. That is, the crest 712 has a non-linear profile (in the y-z plane or crest profile view) such that the crest 712 extends a variable height 714 along its length above the substrate 720/ultrahard layer 710 interface (at the circumference of the cutting element 700). Cutting crest 712 intersects a portion of the peripheral edge 715 to form a cutting edge portion 716. At least one recessed region 718 continuously decreases in height in a direction away from the cutting edge portion 716 to another portion of the peripheral edge 715. Further, as mentioned crest 712 has a variable height that is at its greatest at the intersection with peripheral edge 715 and at its lowest proximate a central or z-axis of the cutting element (i.e., top surface 705 has a reduced height between the two cutting edge portions, thereby forming a substantially saddle shape or hyperbolic paraboloid). As shown, the total height differential of the top surface (between crest and recessed region) is equal to a depth 717. According to some embodiments, a saddle shaped top surface of a cutting element may have a height differential ranging between 0.04 in (1.02 mm) and 0.2 in (5.08 mm) depending on the overall size of the cutting element. For example, the height differential relative to the cutting element diameter may range from 0.1 to 0.5, or from 0.15 to 0.4 in other embodiments. Additionally, in one or more embodiments, the height of the diamond at the peripheral edge adjacent recessed region 718 (i.e., at the side of the cutting element having the lowest diamond height) may be at least 0.04 inches (1.02 mm).

The geometry of the cutting element top surface shown in FIGS. 8-10 may also be described with respect to an x-y-z coordinate system. For example, the cutting element shown in FIG. 12 is reproduced in FIG. 16 along an x-y-z coordinate system. The cutting element 700 has an ultrahard layer 710 disposed on a substrate 720 at an interface 730, and a longitudinal axis coinciding with the z-axis extending there through. The non-planar top surface 705 formed on the ultrahard layer 710 has a geometry formed by varying heights (where the height is measured along the z-axis from a common base plane) along the x-axis and y-axis. As shown, the peak heights formed in the top surface (which may also be referred to as cutting crest 712 in FIG. 7) are formed along the y-axis at the peripheral edge 715 of the cutting element 700. A cross-sectional view of the cutting element 700 along the intersection of the y-axis and z-axis is shown in FIG. 17 and may be referred to as a crest profile view. The crest profile view shows a non-uniform (non-linear) crest having a variable height along the y-axis. Specifically, as illustrate the height of the top surface geometry gradually decreases from the peak heights proximate the peripheral edge 715 (on either side of the cutting element) towards the z-axis to form a concave cross-sectional shape of the top surface 705 along the y-z plane. A cross-sectional view of the cutting element 700 along the intersection of the x-axis and the z-axis is shown in FIG. 18 and shows the general geometric profile of the crest. As illustrated, the height of the top surface gradually increases from the peripheral edge (which may also be referred to as the recessed regions 718 in FIG. 12) towards the z-axis to form a convex cross-sectional shape of the top surface 705 along the x-z plane. The three dimensional shape of the top surface 705 formed by the varying heights has a saddle or hyperbolic paraboloid shape.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Further, it should be understood that any directions or reference frames in the preceding description are merely relative directions or movements. For example, any references to "up" and "down" or "above" or "below" are merely descriptive of the relative position or movement of the related elements. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

What is claimed is:
1. A cutting element comprising:
a substrate having a peripheral edge and a non-planar upper surface, the substrate further having a crest including a longitudinal axis, wherein the non-planar upper surface comprises:
at least one depression formed at least proximate the peripheral edge and in line with the longitudinal axis of the crest, and
a compressive stress hoop extending around the upper surface adjacent the peripheral edge, extending into the at least one depression, and configured to reduce tensile stress in an ultrahard layer; and
the ultrahard layer on the substrate and having a non-planar top surface,
wherein an interface is formed between the ultrahard layer and the substrate,
wherein the ultrahard layer further comprises an extension below the non-planar top surface, and
wherein the extension that extends into the at least one depression of the substrate.

2. The cutting element of claim 1, wherein the depression extends to the peripheral edge.

3. The cutting element of claim 1, comprising two depressions, each of the two depressions having a center point 180 degrees from a center point of the other depression.

4. The cutting element of claim 1, wherein a lowest point of the peripheral edge is within the depression.

5. The cutting element of claim 1, wherein the at least one depression has a depth such that the ultrahard layer has a depth at a deepest point of the at least one depression that is between 15% and 90% of a thickness of the ultrahard layer at a longitudinal axis of the cutting element.

6. The cutting element of claim 1, wherein the at least one depression has a length of between 9% and 96% of a radius of the substrate.

7. The cutting element of claim 1, wherein the at least one depression extends over an arc length of between 12 degrees and 140 degrees of a circumference of the substrate.

8. The cutting element of claim 1, wherein the compressive stress hoop comprises a planar surface perpendicular to a longitudinal axis of the substrate.

9. The cutting element of claim 1, wherein the compressive stress hoop comprises a curved or angled surface and forms an interface with a curved or angled surface of the ultrahard layer.

10. The cutting element of claim 1, wherein an annular width of the compressive stress hoop and a corresponding interface with the ultrahard layer is narrowest 90 degrees from a center point of the at least one depression on the peripheral edge.

11. The cutting element of claim 1, wherein the compressive stress hoop becomes wider as it extends into the at least one depression.

12. The cutting element of claim 1, wherein a narrowest annular width of the compressive stress hoop is between 2% and 50% of a radius of the substrate.

13. The cutting element of claim 1, wherein the crest extends along a central axis of the substrate.

14. The cutting element of claim 13, wherein a top surface of the ultrahard layer comprises a cutting crest.

15. The cutting element of claim 14, wherein the cutting crest is aligned with the crest.

16. The cutting element of claim 1, wherein a cross section of the substrate, extending along the longitudinal axis of the crest comprises:
   two low regions;
   a high region between the two low regions; and
   two curved portions, each curved portion connecting a low region to a high region.

17. A cutting tool including a cutting element according to claim 1.

18. A cutting element comprising:
   a substrate having a peripheral edge and a non-planar upper surface, the substrate further having a crest with a longitudinal axis, wherein the non-planar upper surface comprises at least one depression that extends to the peripheral edge and is in line with the longitudinal axis of the crest; and
   an ultrahard layer on the substrate, the ultrahard layer comprising:
      a non-planar top surface having a cutting edge, the cutting edge being over the at least one depression;
      a bottom surface, such that the bottom surface of the ultrahard layer and the upper surface of the substrate form an interface; and
      an extension below the non-planar top surface, wherein the extension extends into the at least one depression of the substrate,
      wherein the at least one depression has a depth and the ultrahard layer has a thickness at the cutting edge such that the peripheral edge of the non-planar upper surface of the substrate is at a minimum height at the at least one depression.

19. The cutting element of claim 18, wherein the at least one depression has a depth such that the ultrahard layer has a depth at a deepest point of the depression that is between 5% and 100% of a thickness of the ultrahard layer at a longitudinal axis of the cutting element.

20. The cutting element of claim 18, wherein the at least one depression has a length of between greater than 0% and less than 100% of a radius of the substrate.

21. The cutting element of claim 18, wherein the at least one depression extends over an arc length of between 12 degrees and 140 degrees of a circumference of the substrate.

22. A cutting tool including a cutting element according to claim 18.

* * * * *